United States Patent
Dolatsha et al.

(10) Patent No.: US 12,155,452 B2
(45) Date of Patent: Nov. 26, 2024

(54) REPEATER DEVICE AND OPERATION OF REPEATER DEVICE FOR NON-LINE-OF-SIGHT COMMUNICATION

(71) Applicant: Movandi Corporation, Irvine, CA (US)

(72) Inventors: Nemat Dolatsha, San Jose, CA (US); Alfred Grau Besoli, Irvine, CA (US); Yifan Wang, South Brisbane (AU); Ahmadreza Rofougaran, Newport Beach, CA (US)

(73) Assignee: Movandi Corporation, Irvine, CA (US)

( * ) Notice: Subject to any disclaimer, the term of this patent is extended or adjusted under 35 U.S.C. 154(b) by 448 days.

(21) Appl. No.: 17/474,955

(22) Filed: Sep. 14, 2021

(65) Prior Publication Data
US 2022/0263565 A1    Aug. 18, 2022

Related U.S. Application Data

(60) Provisional application No. 63/150,781, filed on Feb. 18, 2021.

(51) Int. Cl.
*H04B 7/155* (2006.01)

(52) U.S. Cl.
CPC .................. *H04B 7/155* (2013.01)

(58) Field of Classification Search
CPC .. H04B 7/0617; H04B 7/0695; H04B 7/0413; H04B 7/0452; H04B 7/024; H04B 7/10; H04B 7/0408; H04B 10/40; H04B 7/2041; H04B 7/0634; H04B 7/0608; H04N 25/75
See application file for complete search history.

(56) References Cited

U.S. PATENT DOCUMENTS

2021/0280981 A1 * 9/2021 Kim ...................... H01Q 1/243

FOREIGN PATENT DOCUMENTS

WO         WO-0117059 A1 *  3/2001  ............. H01Q 1/246

* cited by examiner

*Primary Examiner* — Khalid W Shaheed
(74) *Attorney, Agent, or Firm* — CHIP LAW GROUP

(57) ABSTRACT

A repeater device includes a first antenna array on a first surface, a second antenna array on a second surface opposite to the first surface, and control circuitry. The first antenna array includes a plurality of first antenna elements and the second antenna array includes a plurality of second antenna elements, where each first antenna element is coupled to at least one second antenna element. The control circuitry selects at least one first antenna element and a corresponding second antenna element based on a first direction of signal reception with respect to the first antenna array. The selected first antenna element receives a beam of radio frequency (RF) signal in a first radiation pattern from a first network node in the first direction and corresponding second antenna element transmits the received beam of RF signal in a second radiation pattern to a second network node in a second direction.

17 Claims, 20 Drawing Sheets

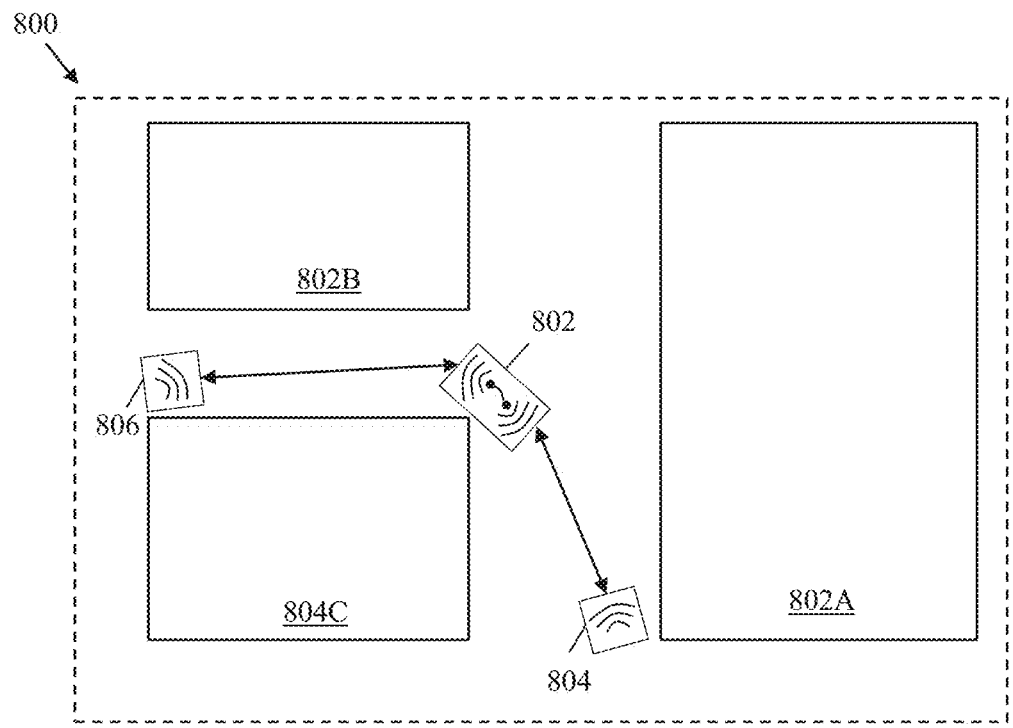
FIG. 8
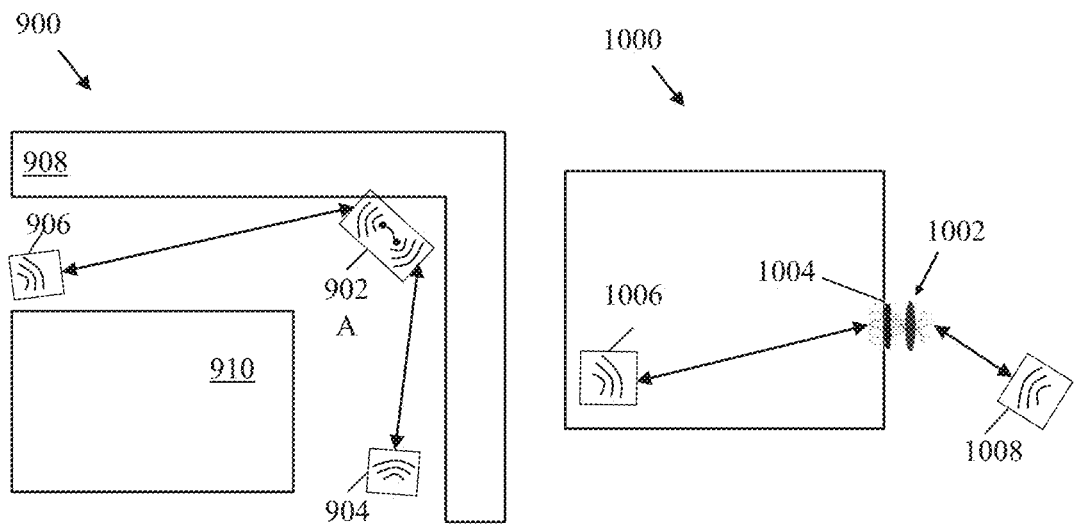
FIG. 9
FIG. 10

1200

Select at least one first antenna element of plurality of first antenna elements in first antenna array on first surface of repeater device and corresponding at least one second antenna element of plurality of second antenna elements in second antenna array on second surface of repeater device based on first direction of signal reception with respect to first antenna array 1202

Control selected at least one first antenna element on first surface to receive beam of radio frequency (RF) signal in first radiation pattern from first network node in first direction 1204

Transmit beam of RF signal in second radiation pattern to second network node in second direction from at least one second antenna element coupled to selected at least one first antenna element such that second radiation pattern is broader than first radiation pattern 1206

Select at least one first antenna element of plurality of first antenna elements in first antenna array on first surface of repeater device and corresponding at least one second antenna element of plurality of second antenna elements in second antenna array on second surface of repeater device based on first direction of signal transmission with respect to first antenna array 1302

Control at least one second antenna element on second surface and coupled to selected at least one first antenna element to receive beam of radio frequency (RF) signal in second radiation pattern from first network node in second direction 1304

Transmit beam of RF signal in first radiation pattern to second network node in first direction from selected at least one first antenna element such that second radiation pattern is broader than first radiation pattern 1306

FIG. 13

REPEATER DEVICE AND OPERATION OF REPEATER DEVICE FOR NON-LINE-OF-SIGHT COMMUNICATION

CROSS-REFERENCE TO RELATED APPLICATIONS/INCORPORATION BY REFERENCE

This application makes reference to, claims priority to, and claims benefit from U.S. Provisional Application Ser. No. 63/150,781 filed on Feb. 18, 2021. The above-referenced Application is hereby incorporated herein by reference in its entirety.

FIELD OF TECHNOLOGY

Certain embodiments of the disclosure relate to communication systems. More specifically, certain embodiments of the disclosure relate to a repeater device and operation of the repeater device for non-line-of-sight communication.

BACKGROUND

Wireless telecommunication in modern times has witnessed advent of various signal transmission techniques and methods, such as use of beam forming and beam steering techniques, for enhancing capacity of radio channels. In accordance with such techniques, a transmitter radiates radio waves in form of beams of radio frequency (RF) signals to a variety of RF receiver devices. The conventional systems which use techniques such as beam forming for signal transmission may be required to implement extreme beam forming when surrounded by obstructions, such as buildings, walls, or the like, so as to avoid loss of communication due to non-line-of-sight situations.

In certain scenarios, conventional repeater devices may be required to be deployed outdoors; for example, they may be mounted at street corners or at corners of a building so that signal from one side of the building can be relayed to the other side for non-line-of-sight communication scenarios. Similarly, in certain other scenarios, some conventional repeater devices may be required to be deployed indoors, in non-line-of-sight scenarios or may be mounted on window panes of a building to mitigate signal attenuation, for example, for mmWave signals. In such scenarios, the conventional repeater device may be required to implement extreme beam forming to avoid loss of communication due presence of obstructions. For implementing extreme beam forming, the conventional repeater devices are required to have complex antenna hardware and/or bulky reflectors, resulting in an increased size of the conventional repeater devices, which is undesirable.

Further limitations and disadvantages of conventional and traditional approaches will become apparent to one of skill in the art through comparison of such systems with some aspects of the present disclosure, as set forth in the remainder of the present application with reference to the drawings.

BRIEF SUMMARY OF THE DISCLOSURE

A repeater device and operation of the repeater device for non-line-of-sight communication, substantially as shown in and/or described in connection with at least one of the figures, as set forth more completely in the claims.

These and other advantages, aspects, and novel features of the present disclosure, as well as details of an illustrated embodiment thereof, will be more fully understood from the following description and drawings.

BRIEF DESCRIPTION OF DRAWINGS

FIG. 8 is a diagram that illustrates an exemplary scenario for outdoor deployment of a repeater device, in accordance with an embodiment of the disclosure.

FIG. 9 is a diagram that illustrates an exemplary scenario for indoor deployment of a repeater device, in accordance with an embodiment of the disclosure.

FIG. 10 is a diagram that illustrates an exemplary scenario for deployment of a repeater device for outdoor to indoor and indoor to outdoor communication, in accordance with an embodiment of the disclosure.

FIG. 12 is a flowchart that illustrates a method of operation of a repeater device for non-line-of-sight communication, in accordance with an embodiment of the disclosure.

FIG. 13 is a flowchart that illustrates a method of operation of a repeater device for non-line-of-sight communication, in accordance with another embodiment of the disclosure.

DETAILED DESCRIPTION OF THE DISCLOSURE

Certain embodiments of the disclosure may be found in a repeater device and operation of the repeater device for enhanced communication. The repeater device and method of the present disclosure provides wireless communication between network nodes in spite of an absence of a line-of-sight (LOS) between the network nodes, without a requirement of extreme beam forming. Typically, conventional repeater devices are required to implement extreme beam forming to avoid loss of communication arising due to a non-line-of-sight (NLOS) situation. Extreme beam forming increases power consumption of the repeater device and requires complex antenna hardware and/or bulky reflectors, and still faces loss of communication in certain non-line-of-sight directions.

Thus, the disclosed repeater device establishes a wireless communication between network nodes that are in a non-line-of-sight by selectively receiving from one the network nodes, a beam of radio frequency (RF) signal in a first radiation pattern from among various beams of RF signals that arrive at the repeater device from different directions and re-transmitting the received beam of RF signal in a second radiation pattern in a second direction of the other network node. The disclosed repeater device establishes the wireless communication between the network nodes without performing extreme beam forming. Alternatively stated, the disclosed repeater device eliminates a requirement to implement extreme beam forming in non-line-of-sight situations and at the same time increases the reliability of wireless connectivity, for example, for enhanced mmWave communication. The disclosed repeater device may be deployed for outdoor wireless communication, indoor wireless communication, outdoor to indoor wireless communication, and/or indoor to outdoor wireless communication. The disclosed repeater device thus enhances the wireless communication capacity, coverage, and reliability between a source network node and a destination network node, for high-performance communication. In the following description, reference is made to the accompanying drawings, which form a part hereof, and in which is shown, by way of illustration, various embodiments of the present disclosure.

Figure 1A:
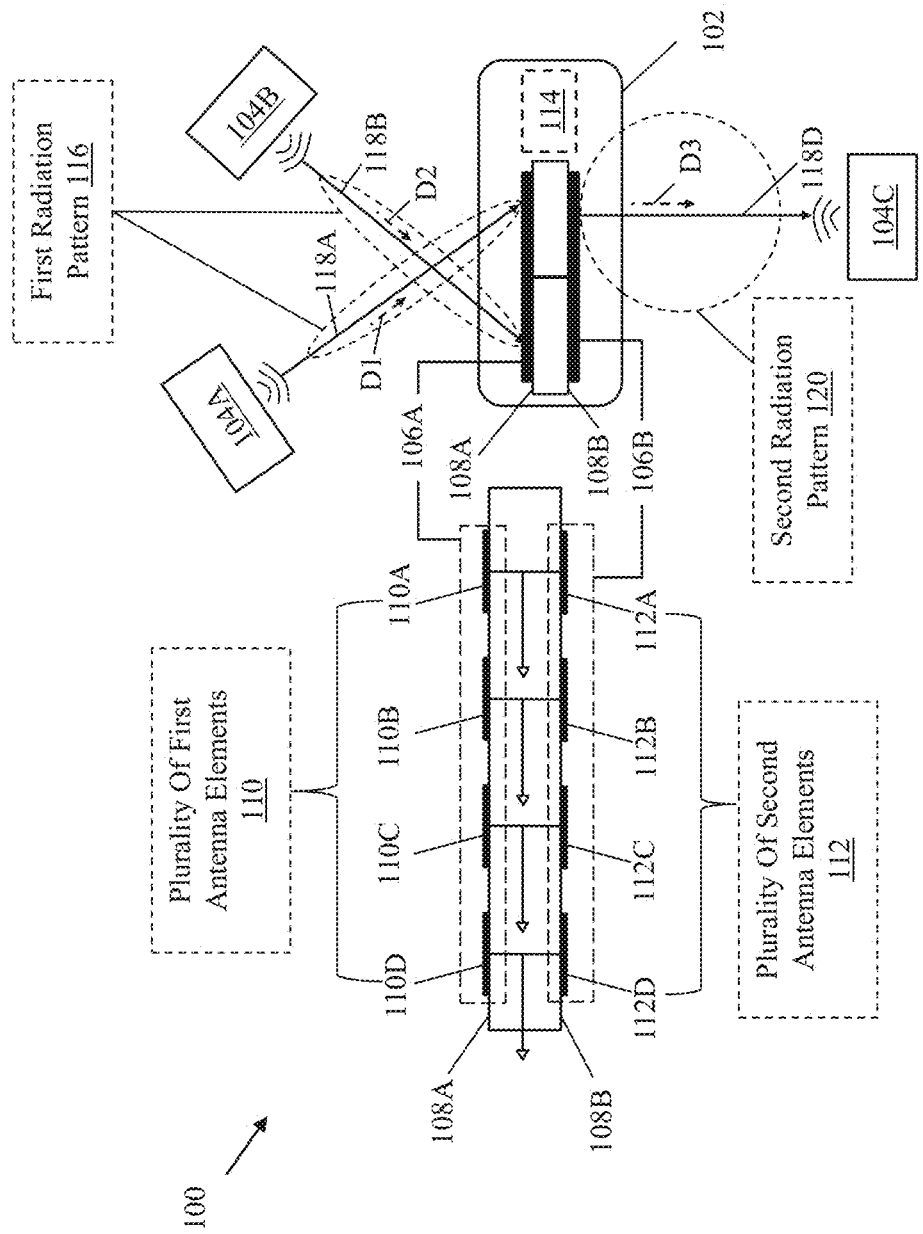
FIG. 1A is a diagram that illustrates a network environment of an exemplary repeater device for non-line-of-sight communication, in accordance with an exemplary embodiment of the disclosure.

FIG. 1A is a diagram that illustrates a network environment of an exemplary repeater device for non-line-of-sight communication, in accordance with an exemplary embodiment of the disclosure. With reference to FIG. 1A, there is shown a network environment 100A that includes a repeater device 102 and a plurality of network nodes, such as a first network node 104A, a second network node 104B, and a third network node 104C. FIG. 1A is described by taking an example of a downlink communication scenario.

The repeater device 102 includes suitable logic, circuitry, and interfaces that may be configured to communicate with various network nodes, such as the first network node 104A, the second network node 104B, and the third network node 104C. The repeater device 102 may be a passive repeater device that establishes wireless communication between two network nodes that are in a non-line-of-sight. The repeater device 102 enables data communication at a multi-gigabit data rate. In accordance with an embodiment, the repeater device 102 may support multiple and a wide range of frequency spectrum, for example, 3G, 4G, and 5G (including out-of-band frequencies). Examples of the repeater device 102 may include, but are not limited to, an XG wireless access point, an XG-enabled passive repeater device, an XG-enabled window-mounted communication device, an XG-enabled wall-mounted communication device, an evolved-universal terrestrial radio access-new radio (NR) dual connectivity (EN-DC) repeater device, an NR-enabled cellular repeater device, a wireless local area network (WLAN)-enabled device, a home router, a MIMO-capable repeater device, or a combination thereof, where "XG" refers to 5G or 6G.

In this case, the first network node 104A and the second network node 104B refer to base stations, small cells, or another repeater device, for example, similar to the repeater device 102. Examples of the first network node 104A and the second network node 104B may include, but are not limited to, base stations (e.g., Evolved Nodes B (eNB) or gNB), small cells, remote radio units (RRU), or other network nodes or communication devices provided in a network.

The third network node 104C refers to a user equipment (UE) (for example, an end-user device), a customer premise equipment (CPE), or another network node. Examples of the UE or the CPE may include, but are not limited to, a smartphone, a virtual reality headset, an augmented reality device, a cable or satellite television set-top box, a VoIP base station, or any other customized hardware for telecommunication.

The repeater device 102 includes a first antenna array 106A and a second antenna array 106B. The first antenna array 106A is arranged on a first surface 108A in the repeater device 102 and the second antenna array 106B is arranged on a second surface 108B, opposite to the first surface 108A. The first surface 108A may be a surface of a printed circuit board (PCB) and a first side of the repeater device 102 facing the base stations (e.g., the first network node 104A and the second network node 104B in this FIG. 1A). The second surface 108B may be the other surface of the PCB and a second side of the repeater device 102 facing one or more UEs (e.g., the third network node 104C in this case), where the second side is opposite the first side. Each of the first antenna array 106A and the second antenna array 106B may refer to one of a single-polarized array, a dual polarized array, or a circularly polarized array. Examples of the first antenna array 106A and the second antenna array 106B may include, but are not limited to, an XG phased-array antenna panel, an XG-enabled antenna chipset, an XG-enabled patch antenna array, where "XG" refers to 5G or 6G.

The first antenna array 106A may include a plurality of first antenna elements 110 that are arranged on the first surface 108A of the repeater device 102. In this exemplary implementation, the first antenna array 106A is described by taking an example of a 1×4 antenna array of 4 antenna elements, such as first antenna elements 110A-110D arranged on the first surface 108A. It is to be understood by one of ordinary skill in the art that the 1×4 antenna array is described for exemplary purpose and that different sizes of antenna array (for example, N×N antenna array) may be employed. In other words, in an actual implementation, the plurality of first antenna elements 110 may include less than four or more than four antenna elements and the first antenna array 106A may be a one-dimension antenna array or a two-dimension antenna array.

The second antenna array 106B may include a plurality of second antenna elements 112 that are arranged on the second surface 108B of the repeater device 102. In this exemplary implementation, the second antenna array 106B is described by taking an example of a 1×4 antenna array of 4 antenna elements, such as second antenna elements 112A-112D arranged on the second surface 108B. It is to be understood by one of ordinary skill in the art that the 1×4 antenna array is described for exemplary purpose and that different sizes of antenna array (for example, N×N antenna array) may be employed. In other words, in an actual implementation, the plurality of second antenna elements 112 may include less than four or more than four antenna elements and the second antenna array 106B may be a one dimension antenna array or a two dimension antenna array.

Each first antenna element of the plurality of first antenna elements 110 on the first surface 108A may be coupled to at least one second antenna element of the plurality of second antenna elements 112 on the second surface 108B. In one example, each first antenna element of the plurality of first antenna elements 110 on the first surface 108A may be coupled (i.e., electrically and conductively coupled) to an independent second antenna element of the plurality of second antenna elements 112 on the second surface 108B. For example, as shown in FIG. 1A, the first antenna elements 110A to 110D on the first surface 108A are coupled to the second antenna elements 112A to 112D on the second surface 108B, respectively. In another example, each single independent antenna on the first surface 108A at one side of the repeater device 102 may be connected (i.e., electrically and conductively coupled) to a corresponding single antenna element or a subarray of antenna elements on the second surface 108B at the other side in order relay a RF signal to different (or same) direction on the other side.

In accordance with an embodiment, the repeater device 102 may comprise control circuitry 114 that may be communicatively coupled to the first antenna array 106A and the second antenna array 106B. The control circuitry 114 may be configured to execute various operations of the repeater device 102. Examples of the implementation of the control circuitry 114 may include but are not limited to an embedded processor, a microcontroller, a specialized digital signal processor (DSP), a Reduced Instruction Set Computing (RISC) processor, an Application-Specific Integrated Circuit (ASIC) processor, a Complex Instruction Set Computing (CISC) processor, and/or other processors, or state machines.

In operation, the first network node 104A and the second network node 104B (e.g., two base stations) functioning as source nodes may not be in a line-of-sight of the third network node 104C (e.g., a UE) functioning as a destination node. Thus, the repeater device 102, which is a passive repeater device, may be used to establish wireless communication between the third network node 104C and one of the first network node 104A and the second network node 104B. The repeater device 102 may include a PCB such that the first side (e.g., the first surface 108A) of the PCB that faces the first network node 104A and the second network node 104B may be mounted with the plurality of first antenna elements 110, and the other side (e.g., the second surface 108B) opposite to the first side and facing the third network node 104C may be mounted with the plurality of second antenna elements 112. Each first antenna element of the plurality of first antenna elements 110 on the first surface 108A may be connected (i.e., electrically and conductively coupled) to a corresponding second antenna element (or a subarray of second antenna elements) of the plurality of second antenna elements 112 on the second surface 108B. In an example, the connection between the plurality of first antenna elements 110 on the first surface 108A and the plurality of second antenna elements 112 on the second surface 108B may be formed by placing RF trace through via holes in the PCB. The connection between the plurality of first antenna elements 110 on the first surface 108A and the plurality of second antenna elements 112 enables RF signals to be relayed from the first side to the second side in a same or different direction.

The plurality of first antenna elements 110 are configured to potentially receive two or more beams of radio frequency (RF) signals in a first radiation pattern 116 (e.g. a narrow beam pattern) from different directions. For example, as shown in FIG. 1A, a first beam of RF signal 118A in the first radiation pattern 116 arrives at the repeater device 102 from a first direction D1 from the first network node 104A and a second beam of RF signal 118B in the first radiation pattern 116 arrives at the repeater device 102 from a second direction D2 from the second network node 104B. The control circuitry 114 may be configured to select at least one first antenna element of the plurality of first antenna elements 110 and the corresponding second antenna element of the plurality of second antenna elements 112 based on a direction of signal reception with respect to the first antenna array 106A. Thus, instead of performing extreme beam forming using the first antenna array 106A, the control circuitry 114 selectively activates at least one first antenna element of the plurality of first antenna elements 110 and the corresponding second antenna element of the plurality of second antenna elements 112 to receive from an appropriate direction, an incoming beam of RF signal.

In an example, a signal strength of the first beam of RF signal 118A may be stronger than a signal strength of the second beam of RF signal 118B. In such a scenario, the control circuitry 114 may be configured to select at least one of the plurality of first antenna elements 110 that corresponds to the first direction D1 from which the first beam of RF signal 118A with a stronger signal strength is received. However, if the signal strength of the second beam of RF signal 118B becomes stronger than the signal strength of the first beam of RF signal 118A, the control circuitry 114 may be configured to switch to another first antenna element of the plurality of first antenna elements 110 that corresponds to the second direction D2 from which the second beam of RF signal 118B is being received. In this case, both the first beam of RF signal 118A the second beam of RF signal 118B may be mmWave signals of same service provider but with different signal strengths.

In another example, the first beam of RF signal 118A may correspond to a first service provider and the second beam of RF signal 118B may correspond to a second service provider, and the third network node 104C may be associated with the first service provider. In such a scenario, the control circuitry 114 may be configured to select at least one of the plurality of first antenna elements 110 that corresponds to the first direction D1 from which the first beam of RF signal 118A corresponding to the first service provider is being received. However, if the recipient of the wireless communication changes to another network node associated with the second service provider, the control circuitry 114 may be configured to switch to another first antenna element of the plurality of first antenna elements 110 that corresponds to the second direction D2 from which the second beam of RF signal 118B associated with the second service provider is being received.

In another example, the first beam of RF signal 118A may be a 5G wireless signal and the second beam of RF signal 118B may be a 4G wireless signal. In such a scenario, the control circuitry 114 may be configured to select at least one of the plurality of first antenna elements 110 that corresponds to the first direction D1 from which the first beam of RF signal 118A is being received. However, if the third network node 104C is not 5G enabled, the control circuitry 114 may be configured to switch to another first antenna element of the plurality of first antenna elements 110 that corresponds to the second direction D2 from which the second beam of RF signal 118B is being received.

Thus, depending on one or more parameters of the first beam of RF signal 118A and the second beam of RF signal 118B, and a requirement of the third network node 104C, the control circuitry 114 may be configured to select at least one first antenna element of the plurality of first antenna elements 110 and the corresponding second antenna element of the plurality of second antenna elements 112.

For the sake of brevity, it is assumed that the control circuitry 114 selects the first antenna element 110A and the corresponding second antenna element 112A based on the first direction D1 of the first beam of RF signal 118A with respect to the first antenna array 106A. It is to be understood that the FIG. 1A is explained by taking an example of the first direction D1. However, another first antenna element of the plurality of first antenna elements 110 and the corresponding second antenna element of the plurality of second antenna elements 112 may be selected based on another direction, such as the second direction D2, with respect to the first antenna array 106A.

In accordance with an embodiment, only the first antenna element 110A and the corresponding second antenna element 112A that are selected may be activated, while all remaining first antenna elements 110B-110D of the plurality of first antenna elements 110 on the first surface 108A and all remaining second antenna elements 112B-112D of the plurality of second antenna elements 112 may be deactivated. In other words, based on the selected at least one first antenna element of the plurality of first antenna elements 110 and the corresponding second antenna element of the plurality of second antenna elements 112, the selected at least one first antenna element of the plurality of first antenna elements 110 and the corresponding second antenna element of the plurality of second antenna elements 112 are activated, while remaining first antenna elements 110B-110D of the plurality of first antenna elements 110 and remaining second antenna elements 112B-112D of the plurality of second antenna elements 112 may be deactivated. Moreover, power (current) may be fed to the first antenna array 106A and the second antenna array 106B such that only the selected first antenna element of the plurality of first antenna elements 110 and the corresponding second antenna element of the plurality of second antenna elements 112 are activated.

The control circuitry 114 may be further configured to control the selected first antenna element 110A on the first surface 108A to receive the first beam of RF signal 118A in the first radiation pattern 116 from the first network node 104A in the first direction D1. The selected first antenna element 110A on the first surface 108A may be configured to provide the received first beam of RF signal 118A to the second antenna element 112A coupled to the selected first antenna element 110A on the second surface 108B. The control circuitry 114 may be further configured to transmit received first beam of RF signal 118C in a second radiation pattern 120 to the third network node 104C in a third direction D3 from the selected second antenna element 112A coupled to the selected first antenna element 110A. The second radiation pattern 120 may be broader than the first radiation pattern 116. For example, the first radiation pattern 116 may be a narrow beam pattern and the second radiation pattern 120 may be a broad beam pattern.

The third network node 104C may be configured to receive the transmitted beam of RF signal 118C. In other words, the third network node 104C which is not in the line-of-sight of the first network node 104A is able to wirelessly communication with the first network node 104A by the repeater device 102. Thus, the repeater device 102 establishes a wireless communication between the first network node 104A and the third network node 104C by selectively receiving from the first network node 104A, the first beam of RF signal 118A in the first radiation pattern 116 (e.g., a narrow beam) and in the first direction D1 from among the two or more beams of RF signals (such as the first beam of RF signal 118A and the second beam of RF signal 118B) that arrive at the repeater device 102 from the different directions (such as the first direction D1 and the second direction D2) and re-transmitting the received first beam of RF signal 118A as the beam of RF signal 118C in the second radiation pattern 120 (e.g., a broad beam) in the third direction D3 to the third network node 104C. For example, the first network node 104A may be a gNB located far away from the repeater device 102. Although multiple narrow beams (e.g., the first beam of RF signal 118A and the second beam of RF signal 118B in the first radiation pattern 116) arrive from different directions (e.g., the first direction D1 and the second direction D2) at one side (e.g., the first surface 108A side) of the repeater device 102, only the narrow beam (e.g., the first beam of RF signal 118A) received from the first network node 104A is allowed to pass to the other side (e.g., the second surface 108B side) of the repeater device 102 as a broad beam (e.g., the beam of RF signal 118C in the second radiation pattern 120). This selective transmission of a broad beam RF signal by the repeater device 102 increases the coverage for one or more UEs that are in communication with the repeater device 102, without the need of extreme beam forming at the repeater device 102, thereby improving on latency, computational resources usage, and power consumption (i.e., reduces power consumption) at the repeater device 102. Here, the repeater device 102 may be a passive repeater that leverages antenna arrangement techniques (for example, arrangement of the plurality of first antenna elements 110 on the first surface 108A and the plurality of second antenna elements 112 on the second surface 108B) for transforming a narrow beam RF signal received at one side of the repeater device 102 to a broad beam RF signal transmitted from the opposite side, unlike active repeaters that heavily rely only on signal processing techniques for such transformation.

In accordance with an embodiment, the repeater device 102 may be deployed outdoors (e.g., at corner of a building, over the building, a street corner, under a bridge or a tunnel) to establish non-line-of-sight wireless communication between two network nodes that are outdoors. In accordance with another embodiment, the repeater device 102 may be deployed indoors (e.g., in interior of a building) to establish non-line-of-sight wireless communication between two network nodes that are indoors. In accordance with an embodiment, the repeater device 102 may be deployed outdoors or indoors (for example, on a glass of a window) to establish non-line-of-sight wireless communication between two network nodes of which one is indoors and the other is outdoors.

Figure 1B:
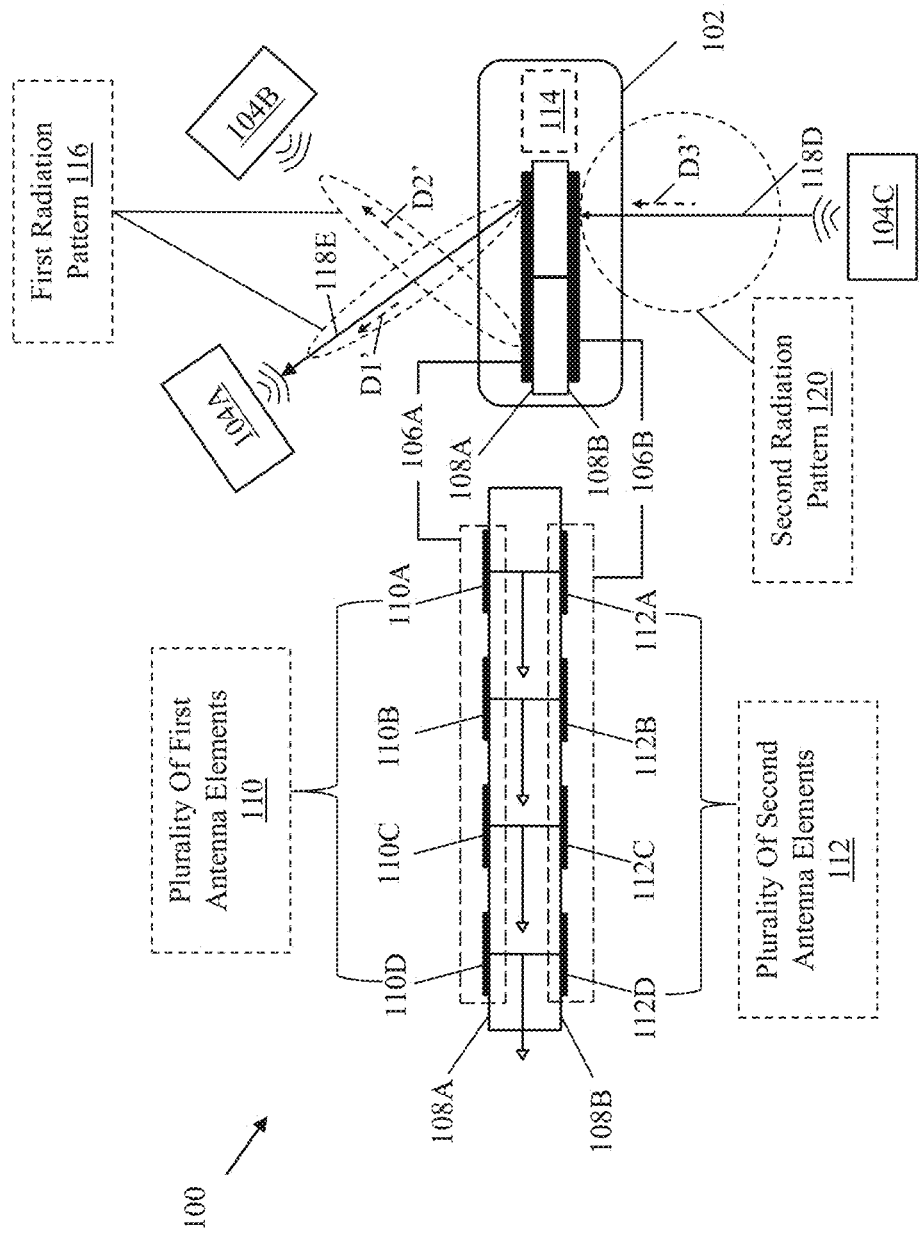
FIG. 1B is a diagram that illustrates a network environment of an exemplary repeater device for non-line-of-sight communication, in accordance with another exemplary embodiment of the disclosure.

FIG. 1B is a diagram that illustrates a network environment of an exemplary repeater device for non-line-of-sight communication, in accordance with another exemplary embodiment of the disclosure. FIG. 1B is described in conjunction with elements from FIG. 1A. With reference to FIG. 1B, there is shown a network environment 100 that includes the repeater device 102 and the plurality of network nodes, such as the first network node 104A, the second network node 104B, and the third network node 104C. FIG. 1B is described by taking an example of an uplink communication scenario. In the uplink communication scenario, the plurality of first antenna elements 110 are configured to potentially transmit two or more beams of RF signals in the first radiation pattern 116 towards different directions, such as directions D1' and D2'.

In operation, the third network node 104C may be a UE, which may not be in a line-of-sight of the first network node 104A (e.g., a first base station) or the second network node 104B (e.g., a second base station). Thus, the repeater device 102, which is a passive repeater device, may be used to establish wireless communication between the third network node 104C and one of the first network node 104A and the second network node 104B.

The control circuitry 114 may be configured to select at least one first antenna element of the plurality of first antenna elements 110 and the corresponding second antenna element of the plurality of second antenna elements 112 based on a direction of signal transmission with respect to the first antenna array 106A.

In an example, the first network node 104A may be nearer to the repeater device 102 than the second network node 104B. In such a scenario, the control circuitry 114 may be configured to select at least one of the plurality of first antenna elements 110 that corresponds to the direction D1' associated with the first network node 104A.

In another example, the first network node 104A may be 5G enabled whereas the second network node 104B may be 4G enabled. In such a scenario, the control circuitry 114 may be configured to select at least one of the plurality of first antenna elements 110 that corresponds to the direction D1' when the third network node 104C is 5G enabled. However, if the third network node 104C is not 5G enabled, the control circuitry 114 may be configured to switch to another first antenna element of the plurality of first antenna elements 110 that corresponds to the direction D2' of the 4G enabled second network node 104B.

In another example, the first network node 104A may correspond to a first service provider and the second network node 104B may correspond to a second service provider, and the third network node 104C may be associated with the first service provider. In such a scenario, the control circuitry 114 may be configured to select at least one of the plurality of first antenna elements 110 that corresponds to the direction D1' of the first network node 104A. However, if the source network node (e.g., the third network node 104C) switches to the second service provider, the control circuitry 114 may be configured to switch to another first antenna element of the plurality of first antenna elements 110 that corresponds to the direction D2' of the second network node 104B.

Thus, depending upon a requirement of the third network node 104C, the control circuitry 114 may be configured to select at least one first antenna element of the plurality of first antenna elements 110 and the corresponding second antenna element of the plurality of second antenna elements 112.

For the sake of brevity, it is assumed that the control circuitry 114 selects the first antenna element 110A and the corresponding second antenna element 112A based on the direction D1' of signal transmission with respect to the first antenna array 106A. It is to be understood that the FIG. 1B is explained by taking an example of the direction D1'. However, another first antenna element of the plurality of first antenna elements 110 and the corresponding second antenna element of the plurality of second antenna elements 112 may be selected based on another direction of signal transmission, such as the direction D2', with respect to the first antenna array 106A.

In accordance with an embodiment, only the first antenna element 110A and the corresponding second antenna element 112A that are selected may be activated, while all remaining first antenna elements 110B-110D of the plurality of first antenna elements 110 on the first surface 108A and all remaining second antenna elements 112B-112D of the plurality of second antenna elements 112 may be deactivated. In other words, based on the selected at least one first antenna element of the plurality of first antenna elements 110 and the corresponding second antenna element of the plurality of second antenna elements 112, the selected at least one first antenna element of the plurality of first antenna elements 110 and the corresponding second antenna element of the plurality of second antenna elements 112 are activated, while remaining first antenna elements 110B-110D of the plurality of first antenna elements 110 and remaining second antenna elements 112B-112D of the plurality of second antenna elements 112 may be deactivated. Moreover, power (current) may be fed to the first antenna array 106A and the second antenna array 106B such that only the selected first antenna element of the plurality of first antenna elements 110 and the corresponding second antenna element of the plurality of second antenna elements 112 are activated.

The control circuitry 114 may be further configured to control the selected second antenna element 112A on the second surface 108B to receive a third beam of RF signal 118D in the second radiation pattern 120 from the third network node 104C in the fourth direction D3'. The fourth direction D3' refers to a direction that is opposite to the third direction D3 (of FIG. 1A). The selected second antenna element 112A on the second surface 108B may be configured to provide the received third beam of RF signal 118D to the selected first antenna element 110A on the first surface 108A that is coupled to the selected second antenna element 112A on the second surface 108B. The control circuitry 114 may be further configured to transmit a received beam of RF signal 118E in the first radiation pattern 116 to the first network node 104A in a fifth direction D1' from the selected first antenna element 110A. Here, the fifth direction D1' may be a direction that is opposite to the first direction D1 (of FIG. 1A). The second radiation pattern 120 may be broader than the first radiation pattern 116. For example, the first radiation pattern 116 may be a narrow beam pattern and the second radiation pattern 120 may be a broad beam pattern.

The first network node 104A may be configured to receive the transmitted beam of RF signal 118E. In other words, the third network node 104C which is not in the line-of-sight of the first network node 104A is able to wirelessly communicate with the first network node 104A by the repeater device 102. Thus, the repeater device 102 establishes a wireless communication between the first network node 104A and the third network node 104C by receiving from the third network node 104C, the third beam of RF signal 118D in the second radiation pattern 120 and in the fourth direction D3', and selectively re-transmitting the received beam of RF signal 118E in the first radiation pattern 116 and in the fifth direction D1' to the first network node 104A.

Figure 2:
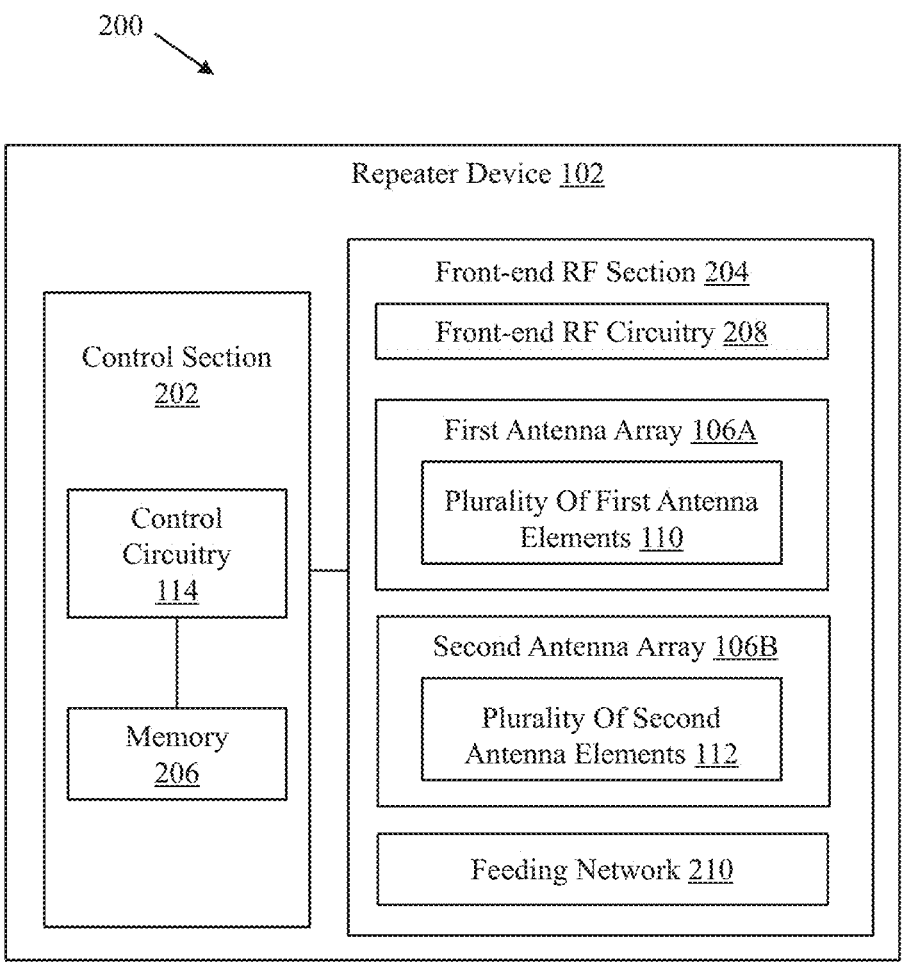
FIG. 2 is a block diagram illustrating various components of an exemplary repeater device, in accordance with an exemplary embodiment of the disclosure.

FIG. 2 is a block diagram illustrating various components of an exemplary repeater device, in accordance with an exemplary embodiment of the disclosure. With reference to FIG. 2, there is shown a block diagram 200 of the repeater device 102. The repeater device 102 may include a control section 202 and a front-end radio frequency (RF) section 204. The control section 202 may include the control circuitry 114 (as described in conjunction with FIGS. 1A and 1B) and a memory 206. The control section 202 may be communicatively coupled to the front-end RF section 204. The front-end RF section 204 may include front-end RF circuitry 208, the first antenna array 106A and the second antenna array 106B (of FIGS. 1A and 1B), and a feeding network 210.

The control circuitry 114 may be communicatively coupled to the first antenna array 106A, the second antenna array 106B, and the memory 208. The control circuitry 114 may be configured to execute various operations of the repeater device 102. The control circuitry 114 may be configured to control various components of the front-end RF section 204. The repeater device 102 may be a programmable device, where the control circuitry 114 may execute instructions stored in the memory 206.

The memory 206 may be configured to store various directions associated with the plurality of first antenna elements 110. Examples of the implementation of the memory 206 may include, but not limited to, a random access memory (RAM), a dynamic random access memory (DRAM), a static random access memory (SRAM), a processor cache, a thyristor random access memory (T-RAM), a zero-capacitor random access memory (Z-RAM), a read only memory (ROM), a hard disk drive (HDD), a secure digital (SD) card, a flash drive, cache memory, and/or other non-volatile memory. It is to be understood by a person having ordinary skill in the art that the control section 202 may further include one or more other components, such as an analog to digital converter (ADC), a digital to analog (DAC) converter, a cellular modem, and the like, known in the art, which are omitted for brevity.

The front-end RF circuitry 208 may include receiver circuitry and transmitter circuitry. In an example, the receiver circuitry may include a cascading receiver chain comprising various components for baseband signal processing or digital signal processing. For example, the receiver circuitry may include a cascading receiver chain comprising various components (e.g., the one or more receiving antenna arrays, a set of low noise amplifiers (LNA), a set of receiver front end phase shifters, and a set of power combiners) for the signal reception (not shown for brevity). In an example, transmitter circuitry may include a cascading transmitter chain comprising various components for baseband signal processing or digital signal processing. The receiver circuitry may be coupled to the first antenna array 106A and the second antenna array 106B in an implementation. The transmitter circuitry may be coupled to the first antenna array 106A and the second antenna array 106B in an implementation. The front-end RF circuitry 208 may support millimeter-wave (mmWave) communication as well communication at a sub 6 gigahertz (GHz) frequency.

The feeding network 210 may define a distribution of conductive RF routings that couple the first antenna array 106A to the second antenna array 106B. For example, the feeding network 210 may be implemented in such a manner to ensure sufficient isolation between the first antenna array 106A and the second antenna array 106B. For example, the first antenna array 106A and the second antenna array 106B may be connected to a ground terminal to implement isolation between the first antenna array 106A and the second antenna array 106B.

Figure 3A:
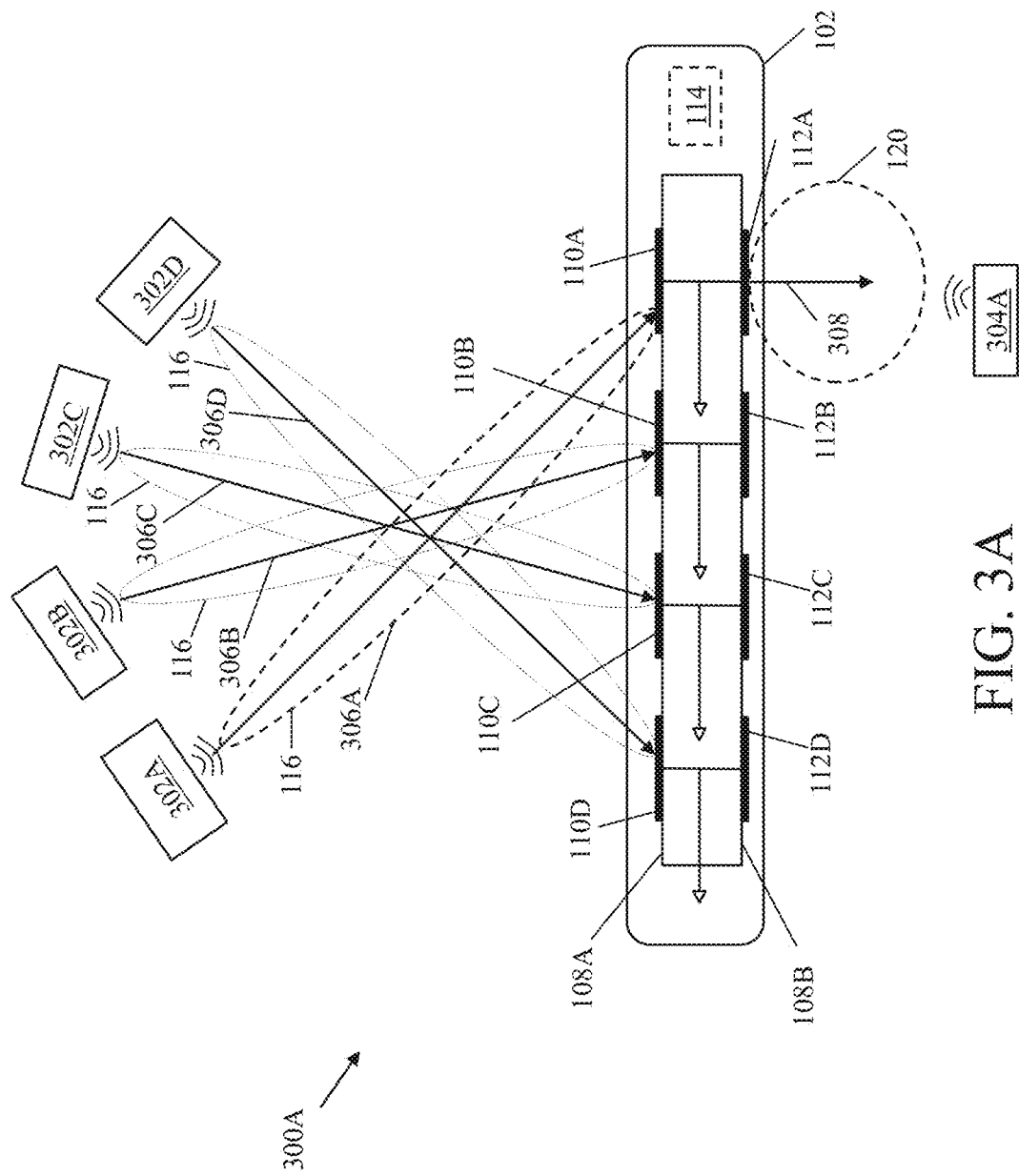
FIGS. 3A and 3B are diagrams that illustrate exemplary operations of a repeater device, in accordance with an exemplary embodiment of the disclosure.
Figure 3B:
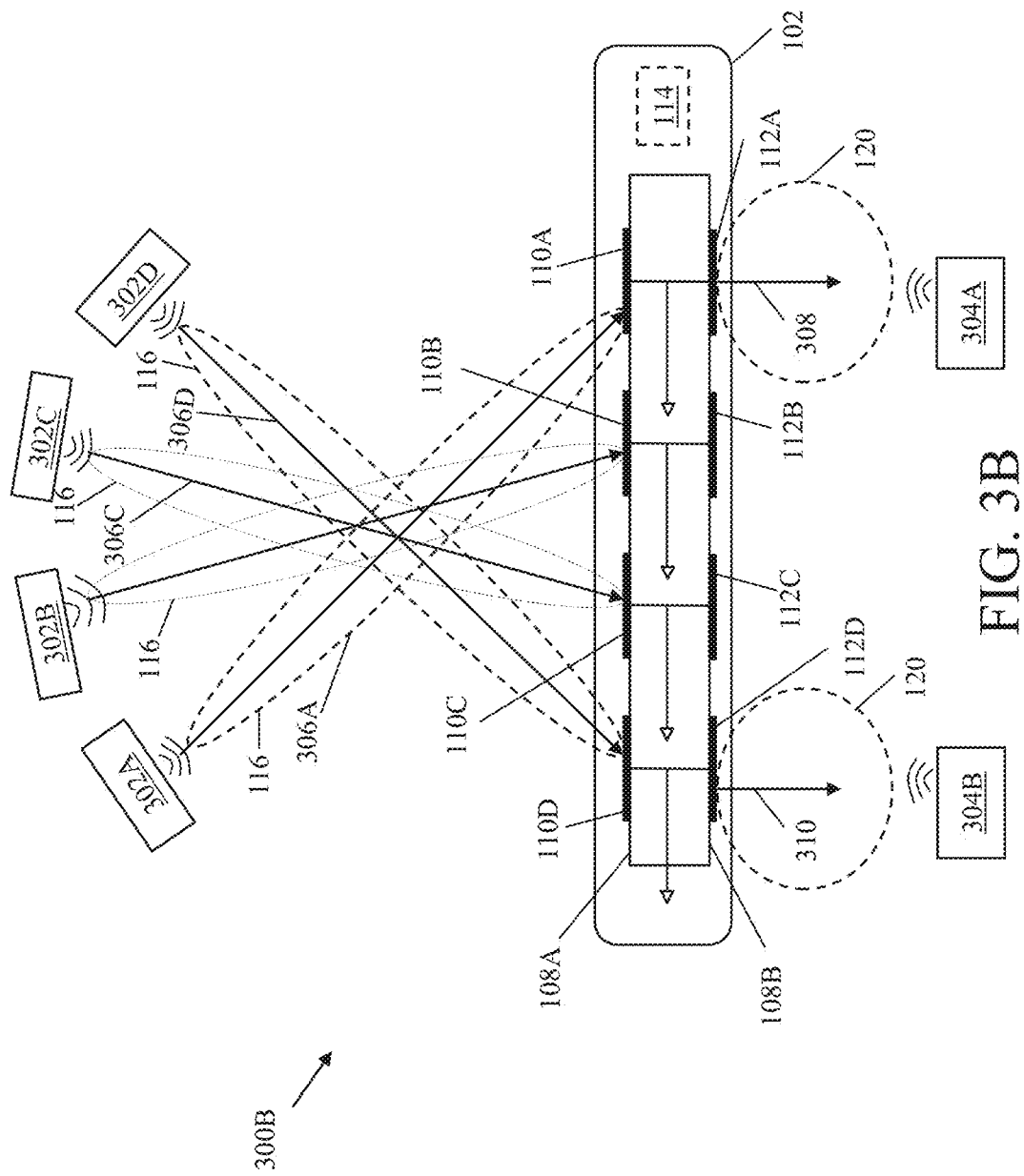

FIGS. 3A and 3B are diagrams that illustrate exemplary operations of a repeater device, in accordance with an exemplary embodiment of the disclosure. FIGS. 3A and 3B are explained in conjunction with elements from FIGS. 1A and 2.

With reference to FIG. 3A, there is shown an exemplary scenario 300A that illustrates operation of the repeater device 102. Multiple beams of radio frequency (RF) signal 306A, 306B, 306C, and 306D in the first radiation pattern 116 (e.g., a narrow beam pattern) may arrive at the repeater device 102 from different network nodes 302A, 302B, 302C, and 302D in different directions. The network nodes 302A, 302B, 302C, and 302D are similar to the first network node 104A and the second network node 104B described in FIG. 1A.

In an example, the control circuitry 114 may be configured to selectively receive the beam of RF signal 306A in the first radiation pattern 116 from the network node 302A by selecting the first antenna element 110A from the plurality of first antenna elements 110 on the first surface 108A and re-transmit the received beam of RF signal 308 in the second radiation pattern 120 by the second antenna element 112A that is on the second surface 108B and coupled to the selected first antenna element 110A to a network node 304A. The network node 304A is similar to the third network node 104C.

Though the other beams of RF signal 306B, 306C, and 306D arrive at the repeater device 102, the other beams of RF signal 306B, 306C, and 306D are not received by the first antenna elements 110B, 110C, and 110D that are deactivated. Since the first antenna elements 110B, 110C, and 110D do not receive the other beams of RF signal 306B, 306C, and 306D, no power is transmitted to the corresponding second antenna elements 112B, 112C, and 112D on the second surface 108B. Thus, the second antenna elements 112B, 112C, and 112D do not transmit any beam of RF signal.

With reference to FIG. 3B, there is shown an exemplary scenario 300B that illustrates the operation of the repeater device 102. In accordance with an embodiment, the multiple beams of RF signal 306A, 306B, 306C, and 306D in the first radiation pattern 116 arriving at the repeater device 102 from different network nodes 302A, 302B, 302C, and 302D in different directions may have different operating frequencies. In such an embodiment, the control circuitry 114 may be configured to simultaneously select two or more first antenna elements of the plurality of first antenna elements 110 based on the direction of the signal reception with respect to the first antenna array 106A and the frequency of signal reception.

For example, as shown in FIG. 3B, the control circuitry 114 may be configured to selectively receive the beam of RF signal 306A having the first radiation pattern 116 and a first frequency from the network node 302A by selecting the first antenna element 110A from the plurality of first antenna elements 110 on the first surface 108A and re-transmit the received beam of RF signal 308 in the second radiation pattern 120 (e.g., a broad beam pattern) by the second antenna element 112A that is on the second surface 108B and coupled to the selected first antenna element 110A. The control circuitry 114 may be further configured to selectively receive the beam of RF signal 306D having the first radiation pattern 116 and a second frequency from the network node 302D by selecting the first antenna element 110D from the plurality of first antenna elements 110 on the first surface 108A and re-transmit the received beam of RF signal 310 in the second radiation pattern 120 by the second antenna element 112D that is on the second surface 108B and coupled to the selected first antenna element 110D. Thus, the repeater device 102 is capable of concurrently establishing a wireless communication between the network node 302A and the network node 304A at the first frequency and a wireless communication between the network node 302D and the network node 304B at the second frequency, where the first frequency is different from the second frequency. Here, the network node 304B is similar to the third network node 104C described in FIG. 1A.

In accordance with an embodiment, the control circuitry 114 may be further configured to simultaneously select two or more first antenna elements of the plurality of first antenna elements 110 and corresponding second antennal elements of the plurality of second antenna elements 112 based on the direction of the signal reception with respect to the first antenna array 106A. For example, when a beam of RF signal in the first radiation pattern 116 arrives at the repeater device 102 from a direction that lies between beam forming directions of two or more first antenna elements of the plurality of first antenna elements 110, the control circuitry 114 may be configured to simultaneously select the two or more first antenna elements of the plurality of first antenna elements 110 and the corresponding second antennal elements of the plurality of second antenna elements 112 for wireless communication.

Figure 4A:
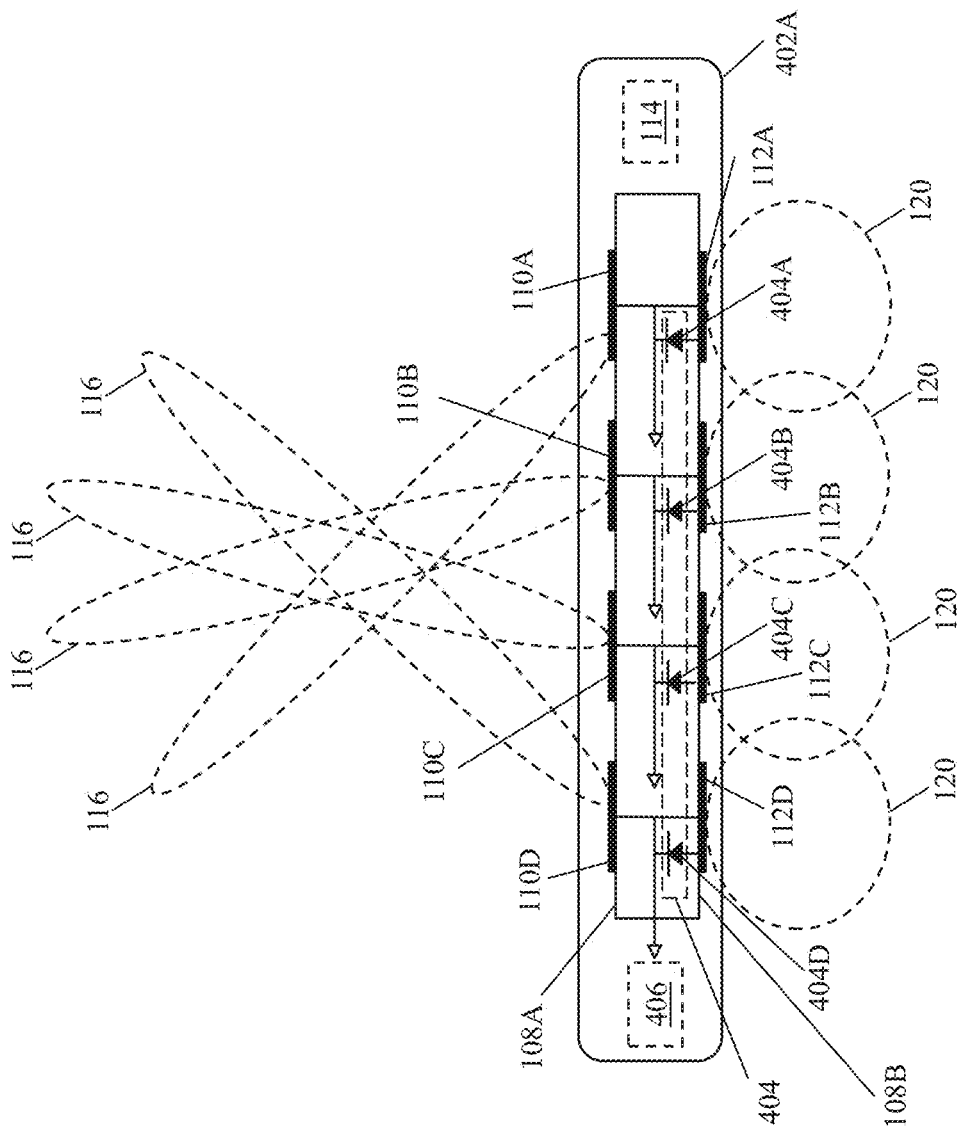
FIG. 4A is a diagram that illustrates an exemplary repeater device, in accordance with another exemplary embodiment of the disclosure.

FIG. 4A is a diagram that illustrates an exemplary repeater device, in accordance with another exemplary embodiment of the disclosure. FIG. 4A is explained in conjunction with elements from FIGS. 1A and 2. With reference to FIG. 4A, there is shown a repeater device 402A. The repeater device 402A is similar to the repeater device 102 except the repeater device 402A includes a first plurality of switches 404 (for example, a first switch 404A, a second switch 404B, a third switch 404C, and a fourth switch 404D) and one or more power sources, such as a power source 406. In accordance with an embodiment, the first plurality of switches 404 may be implemented on the second antenna array 106B side. The first plurality of switches 404 may be configured to couple the plurality of first antenna elements 110 to the plurality of second antenna elements 112. For example, the first switch 404A may be configured to couple the first antenna element 110A to the second antenna element 112A and the second switch 404B may be configured to couple the first antenna element 110B to the second antenna element 112B. Similarly, the third switch 404C may be configured to couple the first antenna element 110C to the second antenna element 112C and the fourth switch 404D may be configured to couple the first antenna element 110D to the second antenna element 112D. In accordance with an embodiment, the first plurality of switches 404 may refer to diodes.

The power source 406 may be configured to power the first plurality of switches 404. Examples of the power source 406 may include, but are not limited to, a battery and a solar panel. The battery may be a Lithium ion battery, Nickel Cadmium battery, a supercapacitor, or the like.

The control circuitry 114 may be configured to control the first plurality of switches 404 by communicating one or more Bluetooth signals, low power LTE signals, Zigbee signals, or any other near field communication (NFC) signals. In accordance with an embodiment, coupling between the plurality of first antenna elements 110 and the plurality of second antenna elements 112 may be controlled by turning on or off the first plurality of switches 404. For example, when the control circuitry 114 turns on the first switch 404A and turns off all remaining switches of the first plurality of switches 404, only the first antenna element 110A remains coupled to the corresponding second antenna elements 112A. In other words, only the first antenna element 110A and the corresponding second antenna element 112A are activated. Remaining first antenna elements 110B, 110C, and 11D are decoupled from the corresponding second antenna elements 112B, 112C, and 112D, and are thus deactivated.

In operation, the control circuitry 114 may be configured to activate a first set of switches of the first plurality of switches 404 and deactivate a second set of switches of the plurality of switches 404 based on the selected at least one first antenna element of the plurality of first antenna elements 110. The first set of switches couples the selected at least one first antenna element on the first surface 108A to the corresponding at least one second antenna element on the second surface 108B. The second set of the switches couples remaining first antenna elements of the plurality of first antenna elements 110 on the first surface 108A to corresponding second antenna elements of the plurality of second antenna elements 112 on the second surface 108B. For example, if the control circuitry 114 selects the first antenna element 110A and the corresponding second antenna element 112A, the first set of switches that is activated (for example, turned on) includes the first switch 404A and the second set of switches that is deactivated (for example, turned off) includes the second switch 404b, the third switch 404C, and the fourth switch 404D.

Figure 4B:
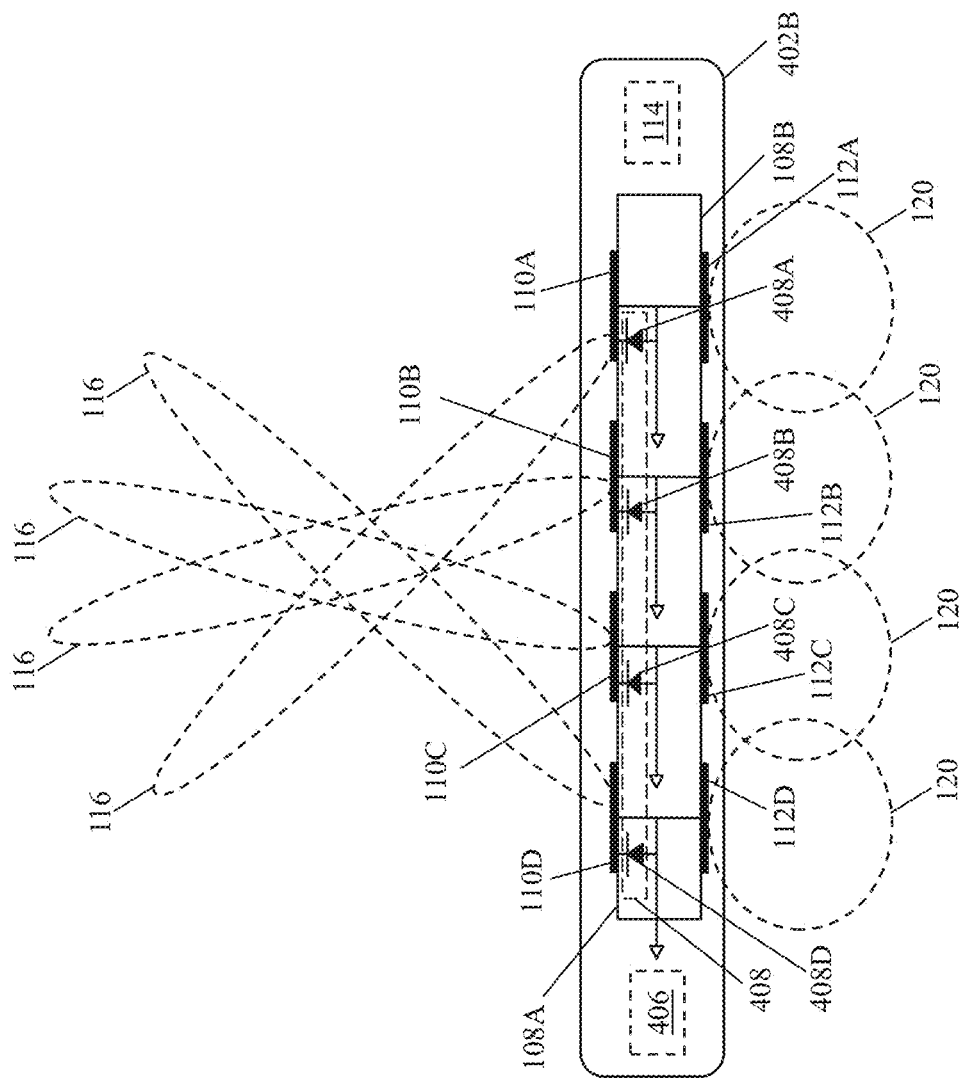
FIG. 4B is a diagram that illustrates an exemplary repeater device, in accordance with another exemplary embodiment of the disclosure.

FIG. 4B is a diagram that illustrates an exemplary repeater device, in accordance with another exemplary embodiment of the disclosure. FIG. 4B is explained in conjunction with elements from FIGS. 1A, 2, and 4A. With reference to FIG. 4B, there is shown a repeater device 402B. The repeater device 402B is similar to the repeater device 402A except the repeater device 402B includes a second plurality of switches 408 (such as a fifth switch 408E, a sixth switch 408F, a seventh switch 408G, and an eighth switch 408H) implemented on the first antenna array 106A side instead of the first plurality of switches 404 implemented on the second antenna array 106B side. The operation of the second plurality of switches 408 is similar to the first plurality of switches 404 as described in FIG. 4A. For example, the fifth switch 408A may be configured to couple the first antenna element 110A to the second antenna element 112A and the sixth switch 408B may be configured to couple the first antenna element 110B to the second antenna element 112B. Similarly, the seventh switch 408C may be configured to couple the first antenna element 110C to the second antenna element 112C and the eighth switch 408D may be configured to couple the first antenna element 110D to the second antenna element 112D. In accordance with an embodiment, the second plurality of switches 408 may refer to diodes controlled by the control circuitry 114 for selective activation and deactivation of the plurality of first antenna elements 110 and the plurality of second antenna elements 112.

Figure 4C:
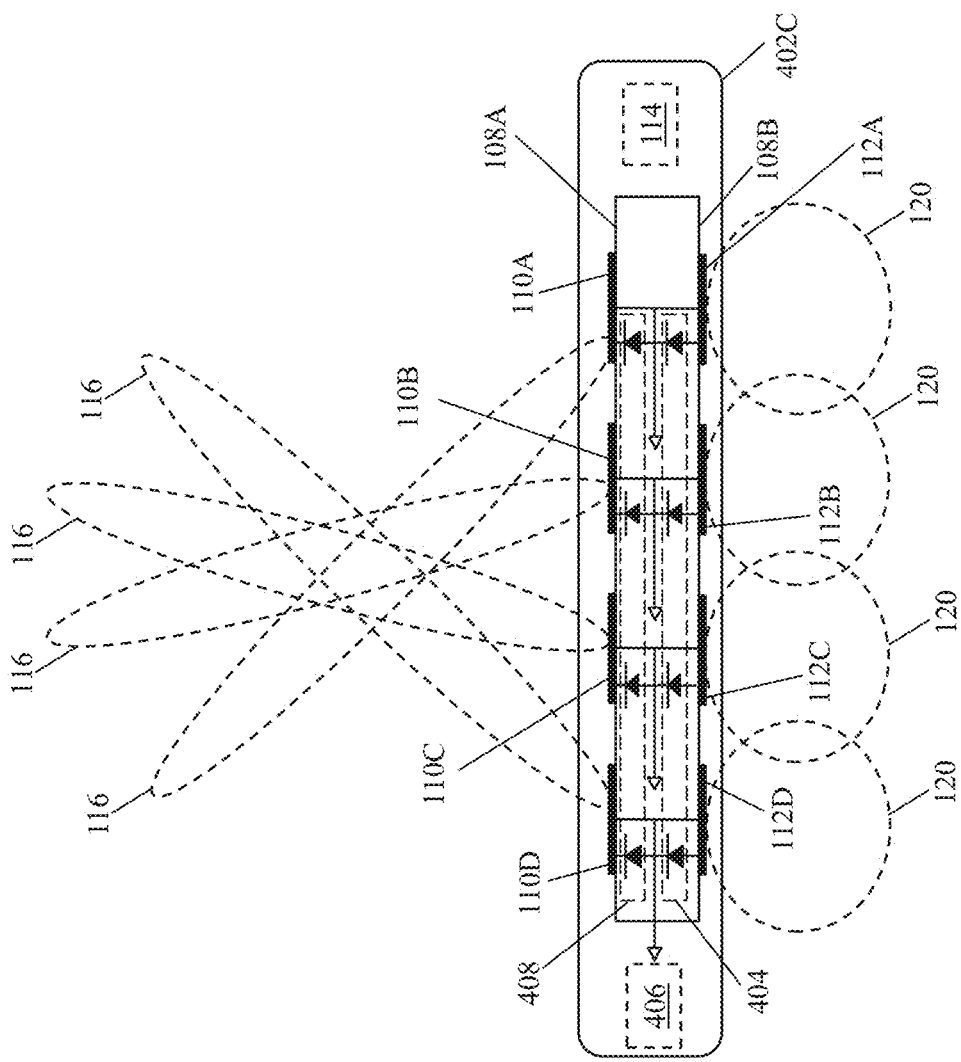
FIG. 4C is a diagram that illustrates an exemplary repeater device, in accordance with another exemplary embodiment of the disclosure.

FIG. 4C is a diagram that illustrates an exemplary repeater device, in accordance with another exemplary embodiment of the disclosure. FIG. 4C is explained in conjunction with elements from FIGS. 1A, 2, 4A, and 4B. With reference to FIG. 4C, there is shown a repeater device 402C. The repeater device 402C is similar to the repeater device 402A and 402B except the repeater device 402C includes the first plurality of switches 404 implemented on the second antenna array 106B side and the second plurality of switches 408 implemented on the first antenna array 106A side. In accordance with an embodiment, the first plurality of switches 404 and the second plurality of switches 408 may refer to diodes controlled by the control circuitry 114 for selective activation and deactivation of the plurality of first antenna elements 110 and the plurality of second antenna elements 112.

Figure 5A:
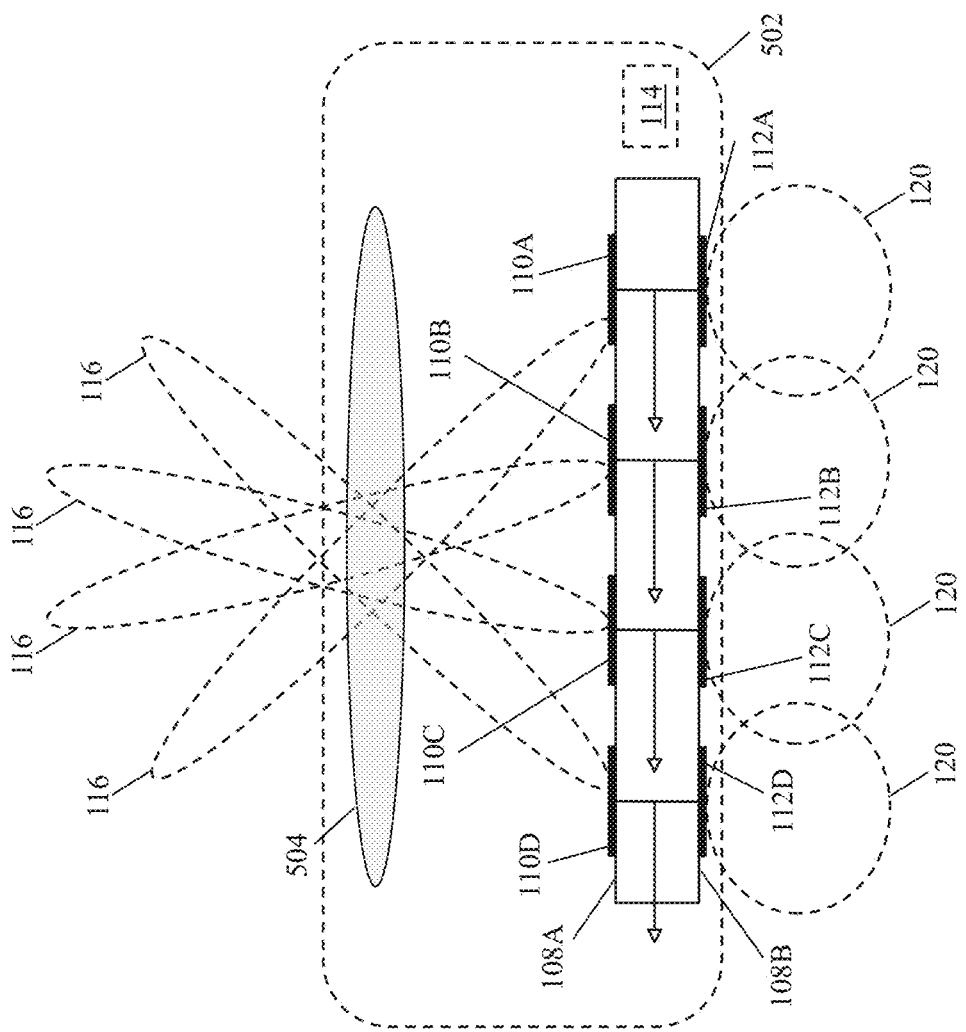
FIGS. 5A and 5B are diagrams that illustrate exemplary repeater devices, in accordance with another exemplary embodiment of the disclosure.
Figure 5B:
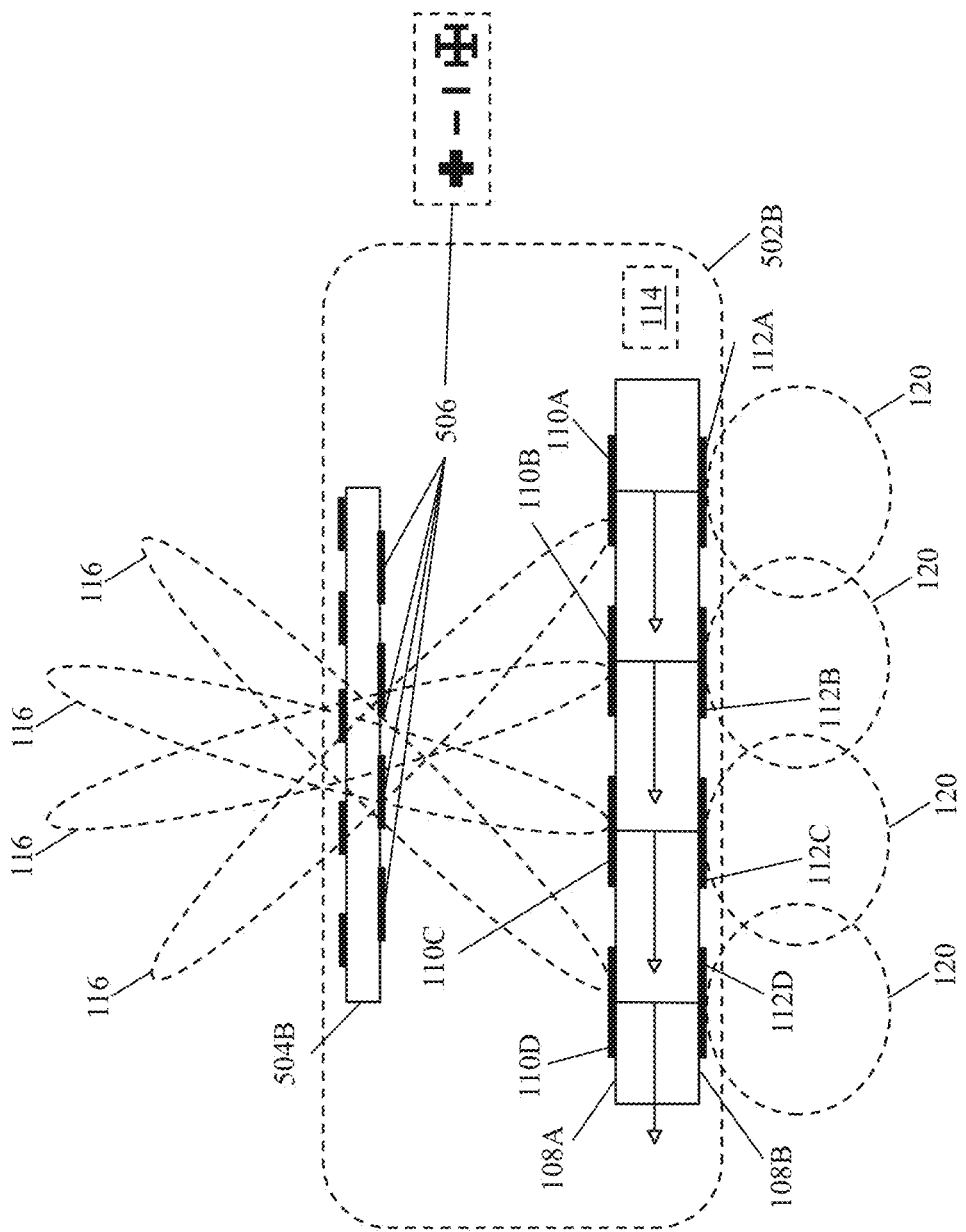

FIGS. 5A and 5B are diagrams that illustrate exemplary repeater devices, in accordance with another exemplary embodiment of the disclosure. FIGS. 5A and 5B are explained in conjunction with elements from FIGS. 1A, 1B, and 2. With reference to FIGS. 5A and 5B, there are shown repeater devices 502A and 502B. The repeater devices 502A and 502B are similar to the repeater device 102 except the repeater devices 502A and 502B include focusing elements 504A and 504B, respectively, on the first antenna array 106A side. The focusing elements 504A and 504B may be lens.

Referring now to FIG. 5A, the focusing elements 504A may be a bi-convex lens, a plano-convex lens, and a concavo-convex. In the downlink communication scenario, the focusing element 504A may be configured to receive multiple incoming beams of RF signal, such as the first beam of RF signal 118A and the second beam of RF signal 118B (of FIG. 1A), from multiple network nodes, such as the first network node 104A and the second network node 104B (of FIG. 1A), in the first radiation pattern 116 and focus the incoming beams of RF signal on to the first antenna array 106A. In other words, the focusing element 504A may be configured to receive the incoming first beam of RF signal 118A (of FIG. 1A) from the first network node 104A (of FIG. 1A) in the first radiation pattern 116, and focus the first beam of RF signal 118A on to the selected first antenna element 110A.

In the uplink communication scenario, the focusing element 504A may be configured to receive a beam of RF signal transmitted by the selected at least one first antenna element of the plurality of first antenna elements 110 and focus the received beam of RF signal in a direction of a destination network node. For example, the focusing element 504A may be configured to receive the third beam of RF signal 118E (of FIG. 1B) transmitted by the selected first antenna element 110A and focus the received third beam of RF signal 118E in the fifth direction D1' of the first network node 104A (of FIG. 1B).

It will be understood by those of ordinary skill in the art that the focusing element 504A may be implemented in the repeater devices 402A, 402B, and 402C as well. In addition, another focusing element similar to the focusing element 504A may be implemented on the second antenna array 106B side as well without deviating from the scope of the disclosure. On the second antenna array 106B side, the focusing element may be configured to either focus a beam of RF signal received from a network node on to the second antenna array 106B or focus beams of RF signal transmitted by one or more second antenna elements of the plurality of second antenna elements 112 on to destination network nodes.

Referring now to FIG. 5B, the focusing element 504B may be a planer lens that has a metal trace printed thereon. The metal trace may have a plurality of phase shifting elements 506. The operation of the focusing element 504B is similar to the operation of the focusing element 504A of FIG. 5A.

Figure 6A:
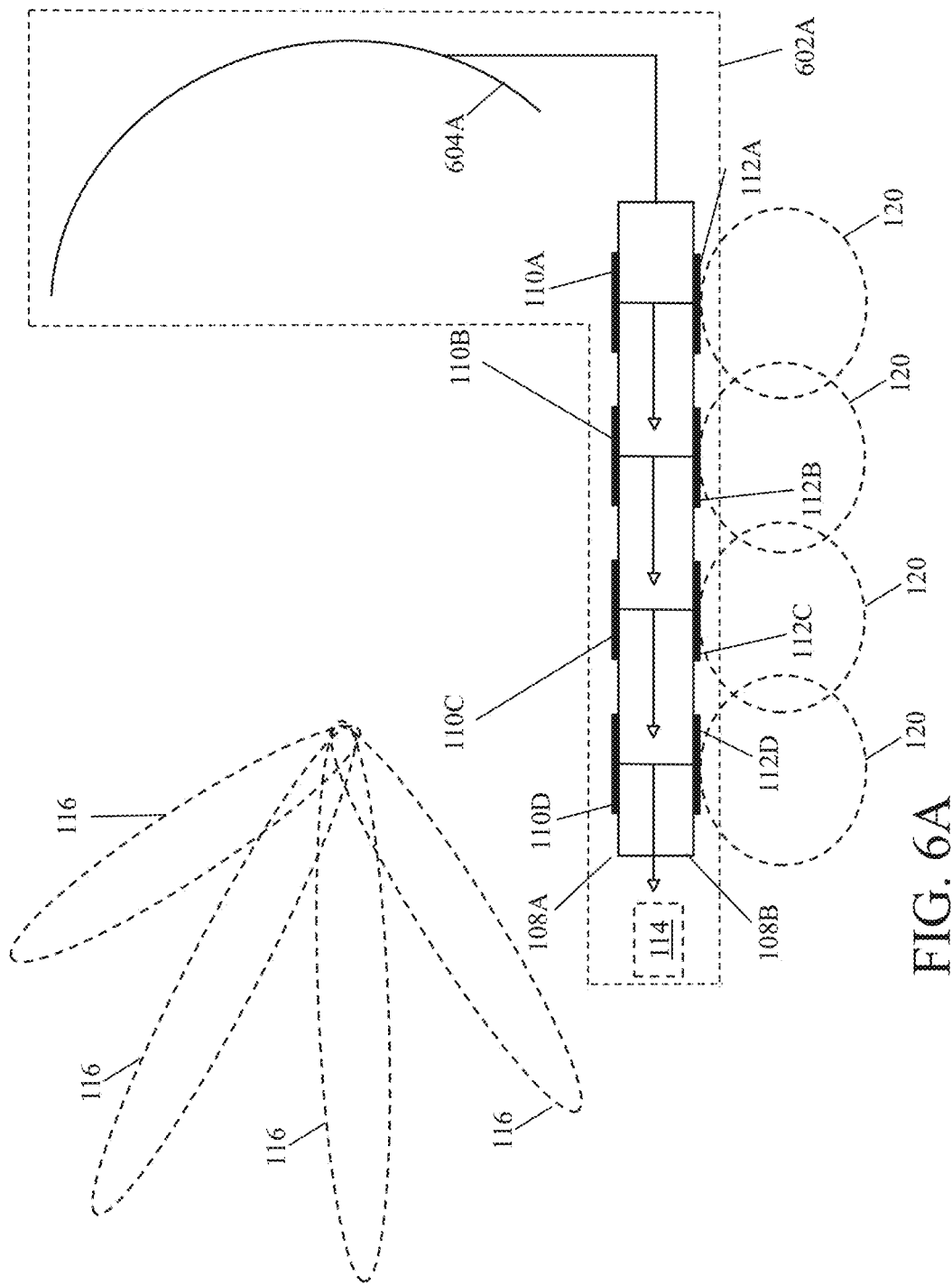
FIGS. 6A and 6B are diagrams that illustrate exemplary repeater devices, in accordance with another exemplary embodiment of the disclosure.
Figure 6B:
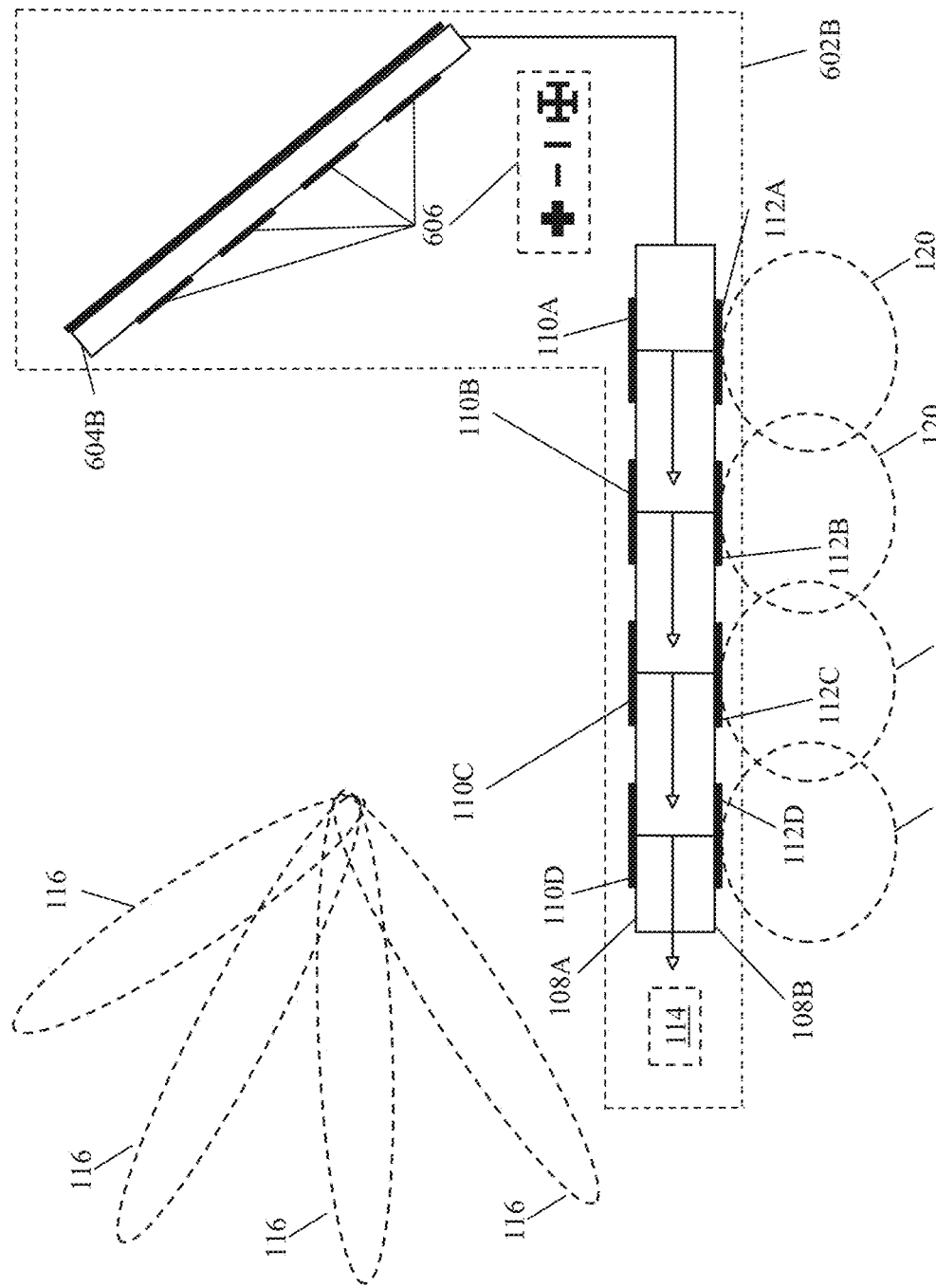

FIGS. 6A and 6B are diagrams that illustrate exemplary repeater devices, in accordance with another exemplary embodiment of the disclosure. FIGS. 6A and 6B are explained in conjunction with elements from FIGS. 1A, 1B, and 2. With reference to FIGS. 6A and 6B, there are shown repeater devices 602A and 602B. The repeater devices 602A and 602B are similar to the repeater device 102 except the repeater devices 602A and 602B include reflecting elements 604A and 604B, respectively, on the first antenna array 106A side. The reflecting elements 604A and 604B may be reflectors or radiators. The repeater device 602A with the reflecting element 604A and the repeater device 602B with the reflecting element 604B may be used instead of the repeater devices 102, 402A, 402B, 402C, and 502 when a line-of-sight between source nodes and the repeater device is obstructed.

Referring now to FIG. 6A, the reflecting element 604A may be a curved metal reflector. In the downlink communication scenario, the reflecting element 604A may be configured to receive multiple incoming beams of RF signal, such as the first beam of RF signal 118A and the second beam of RF signal 118B (of FIG. 1A), from multiple network nodes, such as the first network node 104A and the second network node 104B (of FIG. 1A) in the first radiation pattern 116, and direct the incoming beams of RF signal with the first radiation pattern 116 on to the first antenna array 106A. In other words, the reflecting element 604A may be configured to receive the incoming first beam of RF signal 118A (of FIG. 1A) from the first network node 104A (of FIG. 1A) in the first radiation pattern 116, and direct the first beam of RF signal 118A on to the selected first antenna element 110A. Thus, the reflecting element 604A changes a direction of incoming beam of RF signal in the first radiation pattern 116 so as to direct the incoming beam on to the selected at least one first antenna element of the plurality of first antenna elements 110.

In the uplink communication scenario, the reflecting element 604A may be configured to receive an incoming beam of RF signal transmitted by the selected at least one first antenna element of the plurality of first antenna elements 110 in the first radiation pattern 116 and direct the received beam of RF signal in a direction of a destination network node. For example, the reflecting element 604A may be configured to receive a beam of RF signal transmitted by the selected first antenna element 110A in the first radiation pattern 116 and direct the received beam of RF signal having the first radiation pattern 116 in the direction of the first network node 104A.

In accordance with an embodiment, to achieve an angle of reflection that is different from angle of incidence at the reflecting element 604A, the reflecting element 604A may have a metal trace printed on reflecting side. The metal trace may have a plurality of phase shifting elements 606 (shown in FIG. 6B) that cause the angle of reflection to be different from the angle of incidence.

Referring now to FIG. 6B, the reflecting element 604B may be a planer printed metal reflector with the plurality of phase shifting elements 606. The operation of the reflecting element 604B is similar to the operation of the reflecting element 604A of FIG. 6A.

Figure 7A:
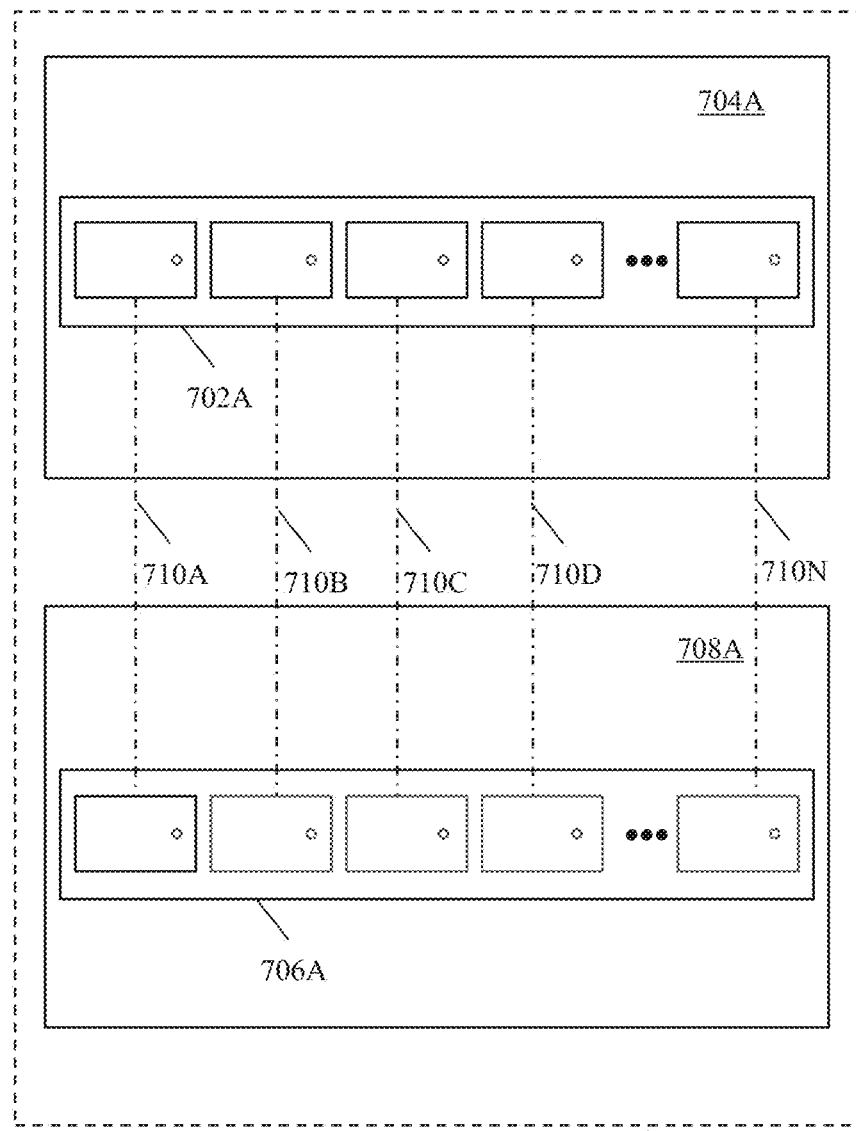
FIG. 7A is a diagram that illustrates an arrangement of antenna elements of a repeater device, in accordance with an exemplary embodiment of the disclosure.

FIG. 7A is a diagram that illustrates an arrangement of antenna elements of a repeater device, in accordance with an exemplary embodiment of the disclosure. FIG. 7A is described in conjunction with elements from FIGS. 1A, 1B, 2, 3A-3B, 4A-4C, 5, and 6A-6B. With reference to FIG. 7A, there is shown a 1×N first antenna array 702A arranged on a first surface 704A (one side) in a repeater device (such as the repeater device 102, 402A, 402B, 402C, 502, 602A, or 602B) and 1×N second antenna array 706A arranged on a second surface 708A (other side) opposite to the first surface 704A. Each antenna element of the 1×N first antenna array 702A on the first surface 704A is coupled to an independent antenna element of the 1×N second antenna array 706A on the second surface 708A.

The connection between each antenna element of the 1×N first antenna array 702A on the first surface 704A and the corresponding antenna element of the 1×N second antenna array 706A on the second surface 708A is shown by hatched lines 710A to 710N. It is to be understood by a person of ordinary skill in the art that the hatched lines 710A to 710N are merely shown for illustration. In an actual implementation, the connection between each antenna element of the 1×N first antenna array 702A on the first surface 704A and the corresponding antenna element of the 1×N second antenna array 706A on the second surface 708A may be formed by placing RF trace through via holes in the PCB.

Figure 7B:
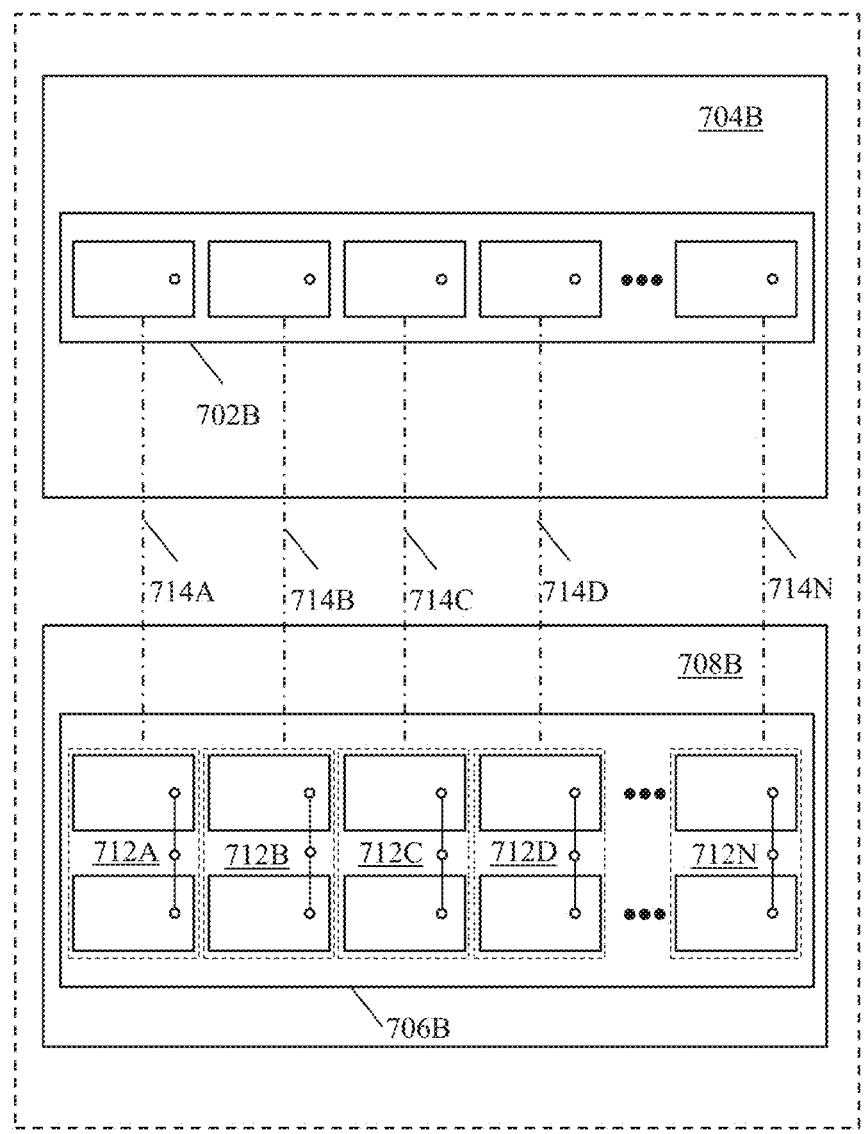
FIG. 7B is a diagram that illustrates an arrangement of antenna elements of a repeater device, in accordance with an exemplary embodiment of the disclosure.

FIG. 7B is a diagram that illustrates an arrangement of antenna elements of a repeater device, in accordance with an exemplary embodiment of the disclosure. FIG. 7B is described in conjunction with elements from FIG. 1A. With reference to FIG. 7B, there is shown a 1×N first antenna array 702B arranged on a first surface 704B (one side of the repeater) in a repeater device (for example, the repeater device 102 of FIG. 1A) and 2×N second antenna array 706B arranged on a second surface 708B (the other side of the repeater device) opposite to the first surface 704B. The 2×N second antenna array 706B arranged on the second surface 708B may include a plurality of sub-arrays 712A to 712N arranged on the second surface 708B such that each sub-array includes two or more second antenna elements of the 2×N second antenna array 706B. For the sake of illustration, the 2×N second antenna array 706B is shown to include 'N' sub-arrays 712A to 712N, each including two second antenna elements. However, it is to be understood that in an actual implementation, the second antenna array 706B may be N×N and each sub-array of the plurality of sub-arrays 712A to 712N may include any number of second antenna elements.

Each antenna element of the 1×N first antenna array 702B on the first surface 704B is coupled to a sub-array (including at least two antenna elements of the 2×N second antenna array 706B) of the plurality of sub-arrays 712A to 712N on the second surface 708B. The connection between one antenna element of the 1×N first antenna array 702B on the first surface 704B to a corresponding sub-array of the plurality of sub-arrays 712A to 712N on the second surface 708B is shown by hatched lines 714A to 714N. It is to be understood by a person of ordinary skill in the art that the hatched lines 714A to 714N are merely shown for illustration. In an actual implementation, the connection between one antenna element of the 1×N first antenna array 702B on the first surface 704B to the corresponding sub-array of the plurality of sub-arrays 712A to 712N on the second surface 708B may be formed by placing RF trace through via holes in the PCB.

In such implementation, at least one first antenna element of the 1×N first antenna array 702B on the first surface 704B and the corresponding sub-array of the plurality of sub-arrays 712A to 712N on the second surface 708B may be selected based on a direction of signal reception or signal transmission with respect to the 1×N first antenna array 702B.

Figure 7C:
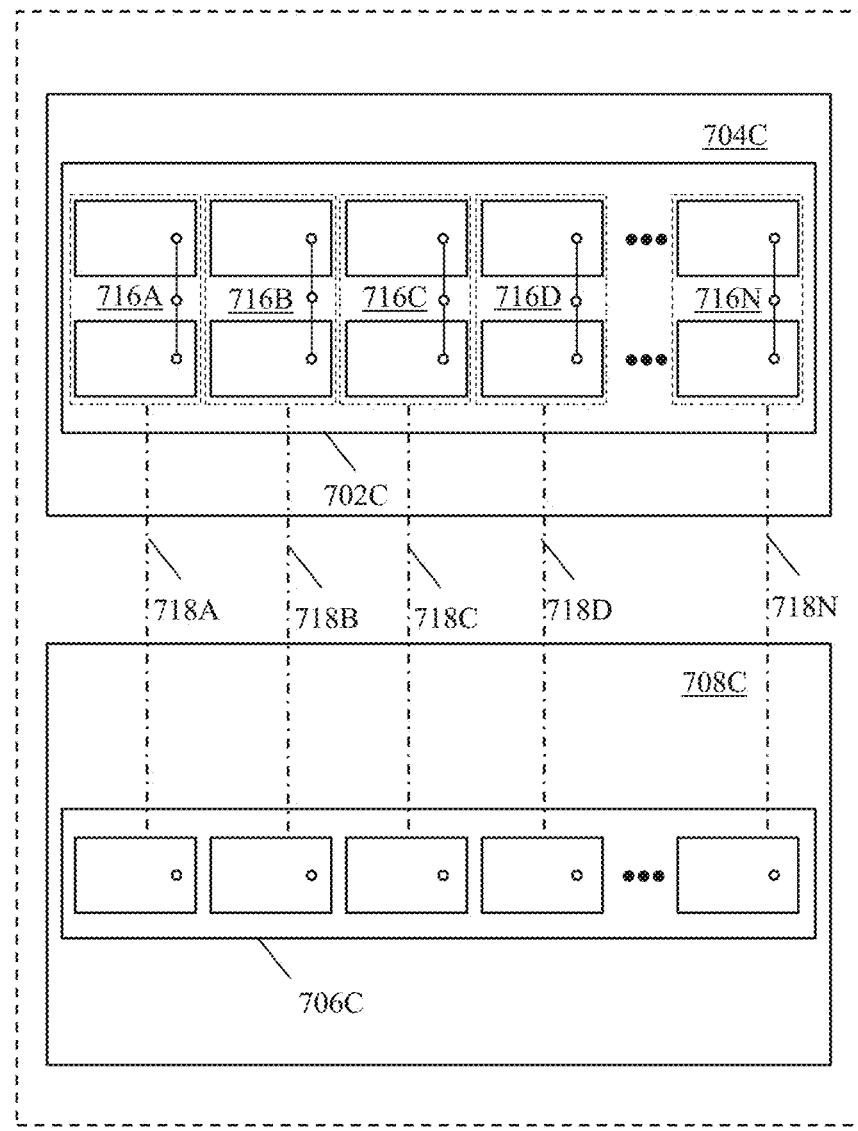
FIG. 7C is a diagram that illustrates an arrangement of antenna elements of a repeater device, in accordance with an exemplary embodiment of the disclosure.

FIG. 7C is a diagram that illustrates an arrangement of antenna elements of a repeater device, in accordance with an exemplary embodiment of the disclosure. FIG. 7C is described in conjunction with elements from FIG. 1A. With reference to FIG. 7C, there is shown a 2×N first antenna array 702C arranged on a first surface 704C in a repeater device (for example, the repeater device 102) and 1×N second antenna array 706C arranged on a second surface 708C opposite to the first surface 704C. The 2×N first antenna array 702C arranged on the first surface 704C may include a plurality of sub-arrays 716A to 716N arranged on the first surface 704C such that each sub-array incudes two or more first antenna elements of the 2×N first antenna array 702C. For the sake of illustration, the 2×N first antenna array 702C is shown to include 'N' sub-arrays 716A to 716N, each including two first antenna elements. However, it is to be understood that in an actual implementation, each sub-array of the plurality of sub-arrays 716A to 716N may include any number of first antenna elements.

Each sub-array of the plurality of sub-arrays 716A to 716N on the first surface 704C is coupled to an independent antenna element of the 1×N second antenna arrays 706C on the second surface 708C. The connection between each sub-array of the plurality of sub-arrays 716A to 716N on the first surface 704C to the corresponding antenna element of the 1×N second antenna array 706C on the second surface 708C is shown by hatched lines 718A to 718N. It is to be understood by a person of ordinary skill in the art that the hatched lines 718A to 718N are merely shown for illustration. In an actual implementation, the connection between each sub-array of the plurality of sub-arrays 716A to 716N on the first surface 704C to the corresponding second antenna element of the 1×N second antenna array 706C on the second surface 708C may be formed by placing RF trace through via holes in the PCB.

In such implementation, a sub-array of the plurality of sub-arrays 716A to 716N on the first surface 704C and the corresponding at least one second antenna element of the 1×N second antenna array 706C on the second surface 708C may be selected based on a direction of signal reception or signal transmission with respect to the 2×N first antenna array 702C.

Figure 7D:
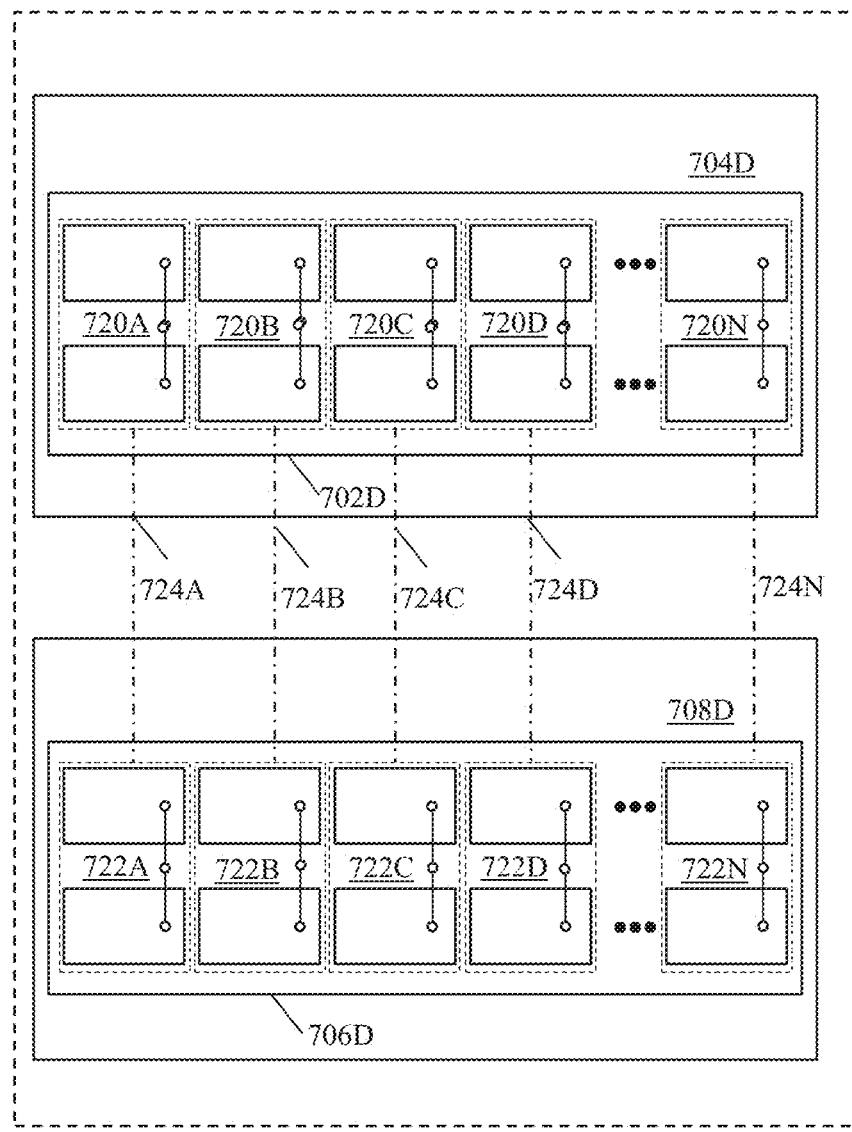
FIG. 7D is a diagram that illustrates an arrangement of antenna elements of a repeater device, in accordance with an exemplary embodiment of the disclosure.

FIG. 7D is a diagram that illustrates an arrangement of antenna elements of a repeater device, in accordance with an exemplary embodiment of the disclosure. FIG. 7D is described in conjunction with elements from FIG. 1A. With reference to FIG. 7D, there is shown a 2×N first antenna array 702D arranged on a first surface 704D in a repeater device (for example, the repeater device 102) and 2×N second antenna array 706D arranged on a second surface 708D opposite to the first surface 704D. The 2×N first antenna array 702D arranged on the first surface 704D may include a plurality of first sub-arrays 720A to 720N arranged on the first surface 704D such that each first sub-array incudes two or more first antenna elements of the 2×N first antenna array 702D. The 2×N second antenna array 706D arranged on the second surface 708D may include a plurality of second sub-arrays 722A to 722N arranged on the second surface 708D such that each second sub-array includes two or more second antenna elements of the 2×N second antenna array 706D. For the sake of illustration, the 2×N first antenna array 702D is shown to include 'N' first sub-arrays 720A to 720N, each including two first antenna elements and the 2×N second antenna array 706D is shown to include 'N' second sub-arrays 722A to 722N, each including two second antenna elements. However, it is to be understood that in an actual implementation, each first sub-array of the plurality of first sub-arrays 720A to 720N and each second sub-array of the plurality of second sub-arrays 722A to 722N may include any number of first and second antenna elements.

Each first sub-array of the plurality of sub-arrays 720A to 720N on the first surface 704D is coupled to a corresponding second sub-array of the plurality of second sub-arrays 722A to 722N on the second surface 708D. The connection between each first sub-array of the plurality of sub-arrays 720A to 720N on the first surface 704D to the corresponding second sub-array of the plurality of second sub-arrays 722A to 722N on the second surface 708D is shown by hatched lines 724A to 724N. It is to be understood by a person of ordinary skill in the art that the hatched lines 724A to 724N are merely shown for illustration. In an actual implementation, the connection between each first sub-array of the plurality of sub-arrays 720A to 720N on the first surface 704D and the corresponding second sub-array of the plurality of second sub-arrays 722A to 722N on the second surface 708D may be formed by placing RF trace through via holes in the PCB.

In such implementation, a first sub-array of the plurality of first sub-arrays 720A to 720N on the first surface 704D and the corresponding second sub-array of the plurality of second sub-arrays 722A to 722N on the second surface 708D may be selected based on a direction of signal reception or signal transmission with respect to the 2×N first antenna array 702D.

It is to be understood that the 2×N antenna array is merely shown for exemplary purpose. In an actual implementation, any N×N antenna array may be used to implement a first antenna array and a second antenna array of the repeater device of present disclosure. Further, it will be understood by a person of ordinary skill in the art that the arrangement of antenna elements as described in FIGS. 7A, 7B, 7C, and 7D may be implemented in any of the repeater devices 102, 402A, 402B, 402C, 502, 602A, or 602B, without deviating from the scope of the disclosure.

FIG. 8 is a diagram that illustrates an exemplary scenario for outdoor deployment of a repeater device, in accordance with an embodiment of the disclosure. FIG. 8 is explained in conjunction with elements from FIGS. 1A, 1B, 2, 4A, 4B, 5, 6A, 6B, and 7A to 7D. With reference to FIG. 8, there is shown in an exemplary scenario 800 where a repeater device 802 is deployed outdoors around a corner of a building 804A to establish wireless communication between network nodes, such as network nodes 806 and 808, that are outdoors and have their line of sight obstructed due to presence of buildings 804A, 804B, and 804C or other obstructions. In such scenario, the repeater device 802 establishes a wireless communication between non-line-of-sight network nodes, such as the network nodes 806 and 808, without the requirement of extreme beam forming towards any of the network nodes 806 and 808.

The network nodes 806 and 808 are similar to the first network node 104A, the second network node 104B, and the third network node 104C of FIGS. 1A and 1B. The repeater device 802 is similar to the repeater devices 102, 402A, 402B, 402C, 502, 602A, or 602B.

FIG. 9 is a diagram that illustrates an exemplary scenario for indoor deployment of a repeater device, in accordance with an embodiment of the disclosure. FIG. 9 is explained in conjunction with elements from FIGS. 1A, 1B, 2, 4A, 4B, 5, 6A, 6B, and 7A to 7D. With reference to FIG. 9, there is shown in an exemplary scenario 900 where a repeater device 902 is deployed indoors around corners of rooms or passageways to establish wireless communication between network nodes, such as network nodes 904 and 906, that are indoors and have their line of sight obstructed due to presence walls, such as walls 908 and 910, or other obstructions. In such scenario, the repeater device 902 may be mounted on corner walls to establish a wireless communication between non-line-of-sight network nodes, such as the network nodes 904 and 906, without the requirement of extreme beam forming at any of the network nodes 904 and 906.

The network nodes 904 and 906 are similar to the first network node 104A, the second network node 104B, and the third network node 104C of FIGS. 1A and 1B. The repeater device 902 can be any of the repeater devices 102, 402A, 402B, 402C, 502, 602A, or 602B (of FIGS. 1A and 1B, 4A, 4B, 4C, 5, 6A, and 6B).

FIG. 10 is a diagram that illustrates an exemplary scenario for deployment of a repeater device for outdoor to indoor and indoor to outdoor communication, in accordance with an embodiment of the disclosure. FIG. 10 is explained in conjunction with elements from FIGS. 1A, 1B, 2, 4A, 4B, 5, 6A, 6B, and 7A to 7D. With reference to FIG. 10, there is shown in an exemplary scenario 1000 where a repeater device 1002 is deployed on a window glass 1004 (indoors or outdoors), to establish wireless communication between network nodes, such as network nodes 1006 and 1008, one of which is indoors and the other is outdoors, and have their line of sight obstructed.

The network nodes 1006 and 1008 are similar to the first network node 104A, the second network node 104B, and the third network node 104C of FIGS. 1A and 1B. The repeater device 1002 can be any of the repeater devices 102, 402A, 402B, 402C, 502, 602A, or 602B (of FIGS. 1A and 1B, 4A, 4B, 4C, 5, 6A, and 6B).

Figure 11:
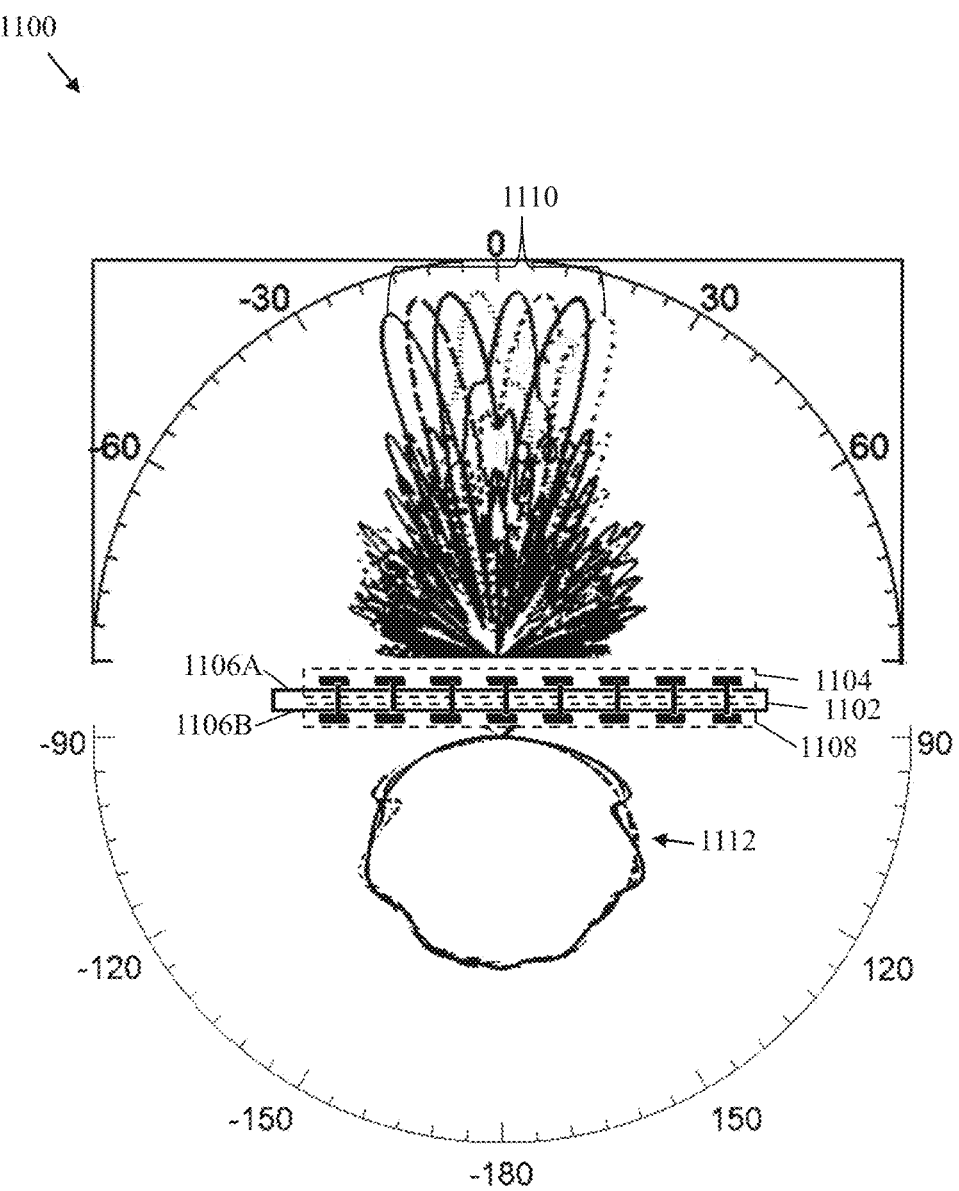
FIG. 11 is a diagram that illustrates exemplary simulation results indicating exemplary operation of a repeater device, in accordance with an embodiment of the disclosure.

FIG. 11 is a diagram that illustrates simulation results indicating operation of a repeater device, in accordance with an embodiment of the disclosure. With reference to FIG. 11, there is shown a diagram 1100 that illustrates simulation results indicating operation of a repeater device 1102. In this case, the repeater device 1102 may have a 1×8 first antenna array 1104 arranged on a first surface 1106A (one side) and a 1×8 second antenna array 1108 arranged on a second surface 1106B (other side) opposite to the first surface 1106A. Each antenna element of the 1×8 first antenna array 1104 on the first surface 1106A is coupled to an independent antenna element of the 1×8 second antenna array 1108 on the second surface 1106B. In the diagram 1100, for eight incoming beams of RF signals 1110 in the first radiation pattern 116 (e.g., 8 narrow beams), eight corresponding beams of RF signals 1112 in the second radiation pattern 120 (e.g., broad beams) may be generated. It is to be understood that in the FIG. 11, only 2-3 broad beams may be visible in the form of the beams of RF signals 1112 and shown for representation purposes, but 8 beams may be generated in practice.

FIG. 12 is a flowchart that illustrates a method of operation of a repeater device for non-line-of-sight communication, in accordance with an embodiment of the disclosure. FIG. 12 is explained in conjunction with elements from FIGS. 1A, 1B, 2, 3A, 3B, 4A, 4B, 4C, 5, 6A, 6B, 7A to 7D, 8, 9, and 10. With reference to FIG. 12, there is shown a flowchart 1200 comprising exemplary operations 1202 through 1206.

At 1202, at least one first antenna element of a plurality of first antenna elements (e.g., the plurality of first antenna elements 110) in a first antenna array (e.g., the first antenna array 106A) on a first surface (e.g., the first surface 108A) of a repeater device (e.g., the repeater device 102, 402A, 402B, 402C, 502, 602A, and 602B, 802, 902, or 1002) and a corresponding at least one second antenna element of a plurality of second antenna elements (e.g., the plurality of second antenna elements 112) in a second antenna array (e.g., the second antenna array 106B) on a second surface (e.g., the second surface 108B) of the repeater device are selected based on a first direction of signal reception with respect to the first antenna array.

In an example, the first antenna element 110A from the plurality of first antenna elements 110 on the first surface 108A and the corresponding second antenna element 112A from the plurality of second antenna elements 112 on the second surface 108B may be selected when the first beam of RF signal 118A in the first radiation pattern 116 is to be received from the first network node 104A in the first direction D1. In another example, the first antenna element 110B from the plurality of first antenna elements 110 on the first surface 108A and the corresponding second antenna element 112B from the plurality of second antenna elements 112 on the second surface 108B may be selected when the second beam of RF signal 118B in the first radiation pattern 116 is to be received from the second network node 104B in the second direction D2.

At 1204, the selected at least one first antenna element on the first surface is controlled to receive the beam of RF signal in the first radiation pattern from the first network node in the first direction. In an example, the selected at least one first antenna element 110A on the first surface 108A may be controlled to receive the first beam of RF signal 118A in the first radiation pattern 116 from the first network node 104A in the first direction D1.

At 1206, the beam of RF signal is transmitted in a second radiation pattern to a second network node in a second direction from the at least one second antenna element coupled to the selected at least one first antenna element such that the second radiation pattern is broader than the first radiation pattern. In an example, the beam of RF signal 118C is transmitted in the second radiation pattern 120 to the second network node (e.g., the third network node 104C) in the second direction (e.g., the direction D3) from the at least one second antenna element 112A coupled to the selected at least one first antenna element 110A such that the second radiation pattern 120 is broader than the first radiation pattern 116.

FIG. 13 is a flowchart that illustrates a method of operation of a repeater device for non-line-of-sight communication, in accordance with an embodiment of the disclosure. FIG. 13 is explained in conjunction with elements from FIGS. 1A, 1B, 2, 3A, 3B, 4A, 4B, 4C, 5, 6A, 6B, 7A to 7D, 8, 9, and 10. With reference to FIG. 13, there is shown a flowchart 1300 comprising exemplary operations 1302 through 1306.

At 1302, at least one first antenna element of a plurality of first antenna elements (e.g., the plurality of first antenna elements 110) in a first antenna array (e.g., the first antenna array 106A) on a first surface (e.g., the first surface 108A) of a repeater device (e.g., the repeater device 102, 402A, 402B, 402C, 502, 602A, and 602B, 802, 902, or 1002) and a corresponding at least one second antenna element of a plurality of second antenna elements (e.g., the plurality of second antenna elements 112) in a second antenna array (e.g., the second antenna array 106B) on a second surface (e.g., the second surface 108B) of the repeater device are selected based on a first direction of signal transmission with respect to the first antenna array.

In an example, the first antenna element 110A from the plurality of first antenna elements 110 on the first surface 108A and the corresponding second antenna element 112A from the plurality of second antenna elements 112 on the second surface 108B may be selected when the direction of signal transmission corresponds to the first network node 104A in the first direction D1. In another example, the first antenna element 110B from the plurality of first antenna elements 110 on the first surface 108A and the corresponding second antenna element 112B from the plurality of second antenna elements 112 on the second surface 108B may be selected when the direction of signal transmission corresponds to the second network node 104B in the second direction D2.

At 1304, the selected at least one second antenna element on the second surface and coupled to the selected at least first antenna element is controlled to receive the beam of RF signal in a second radiation pattern from a first network node in a second direction. In an example, the selected at least one second antenna element 112A on the second surface 108B and coupled to the selected at least one first antenna element 110A may be controlled to receive the beam of RF signal 118D in the second radiation pattern 120 from the third network node 104C in the fourth direction D3'.

At 1306, the beam of RF signal is transmitted in a first radiation pattern to a second network node in the first direction from the selected at least one first antenna element such that the second radiation pattern is broader than the first radiation pattern. In an example, the beam of RF signal 118E is transmitted in the first radiation pattern 116 to the second network node (e.g., the first network node 104A) in the first direction (e.g., the direction D1') from the selected at least one first antenna element 110A such that the second radiation pattern 120 is broader than the first radiation pattern 116.

Various embodiments of the disclosure may provide a repeater device, for example, the repeater device 102, 402A, 402B, 402C, 502, 602A, and 602B, 802, 902, or 1002). The repeater device 102, 402A, 402B, 402C, 502, 602A, and 602B, 802, 902, or 1002 includes a first antenna array that is arranged on a first surface and comprises a plurality of first antenna elements. The plurality of first antenna elements are configured to potentially receive two or more beams of radio frequency (RF) signals in a first radiation pattern 116 from different directions. The repeater device 102, 402A, 402B, 402C, 502, 602A, and 602B, 802, 902, or 1002 further includes a second antenna array that is arranged on a second surface opposite to the first surface and comprises a plurality of second antenna elements. Each first antenna element of the plurality of first antenna elements on the first surface is coupled to at least one second antenna element of the plurality of second antenna elements on the second surface. The repeater device 102, 402A, 402B, 402C, 502, 602A, and 602B, 802, 902, or 1002 further includes control circuitry 114 configured to select at least one first antenna element of the plurality of first antenna elements and a corresponding at least one second antenna element of the plurality of second antenna elements based on a first direction of signal reception with respect to the first antenna array. The control circuitry 114 is further configured to control the selected at least one first antenna element on the first surface to receive a beam of RF signal in the first radiation pattern from a first network node in the first direction. The control circuitry 114 is further configured to transmit the beam of RF signal in a second radiation pattern 120 to a second network node in a second direction from the at least one second antenna element coupled to the selected at least one first antenna element such that the second radiation pattern 120 is broader than the first radiation pattern 116.

Various embodiments of the disclosure may provide a repeater device, for example, the repeater device 102, 402A, 402B, 402C, 502, 602A, and 602B, 802, 902, or 1002). The repeater device 102, 402A, 402B, 402C, 502, 602A, and 602B, 802, 902, or 1002 includes a first antenna array that is arranged on a first surface and comprises a plurality of first antenna elements. The plurality of first antenna elements are configured to potentially transmit two or more beams of radio frequency (RF) signals in a first radiation pattern towards different directions. The repeater device 102, 402A, 402B, 402C, 502, 602A, and 602B, 802, 902, or 1002 further includes a second antenna array that is arranged on a second surface opposite to the first surface and comprises a plurality of second antenna elements. Each first antenna element of the plurality of first antenna elements on the first surface is coupled to at least one second antenna element of the plurality of second antenna elements on the second surface. The repeater device 102, 402A, 402B, 402C, 502, 602A, and 602B, 802, 902, or 1002 further includes control circuitry 114 configured to select at least one first antenna element of the plurality of first antenna elements and a corresponding at least one second antenna element of the plurality of second antenna elements based on a first direction of signal transmission with respect to the first antenna array. The control circuitry 114 is further configured to control the at least one second antenna element that is on the second surface and coupled to the selected at least first antenna element, to receive a beam of RF signal in a second radiation pattern 120 from a first network node in a second direction. The control circuitry 114 is further configured to transmit the beam of RF signal in the first radiation pattern 116 to a second network node in the first direction from the selected at least one first antenna element on the first surface, such that the first radiation pattern 116 is narrower than the second radiation pattern 120.

Various embodiments of the disclosure may provide a non-transitory computer-readable medium having stored thereon, computer-implemented instructions which when executed by a computer in a repeater device causes the repeater device to execute operations that may comprise selecting at least one first antenna element of a plurality of first antenna elements in a first antenna array on a first surface of the repeater device and a corresponding at least one second antenna element of a plurality of second antenna elements in a second antenna array on a second surface of the repeater device, where the selection of the at least one first antenna element on the first surface and the corresponding at least one second antenna element on the second surface is based on a first direction of signal reception with respect to the first antenna array, wherein the second surface is opposite to the first surface. The operations may further comprise controlling the selected at least one first antenna element on the first surface to receive a beam of radio frequency (RF) signal in a first radiation pattern from a first network node in a first direction. The operations may further comprise transmitting the beam of RF signal in a second radiation pattern to a second network node in a second direction from the at least one second antenna element coupled to the selected at least one first antenna element, where the second radiation pattern is broader than the first radiation pattern.

Various embodiments of the disclosure may provide a non-transitory computer-readable medium having stored thereon, computer-implemented instructions which when executed by a computer in a repeater device causes the repeater device to execute operations that may comprise selecting at least one first antenna element of a plurality of first antenna elements in a first antenna array on a first surface of the repeater device and a corresponding at least one second antenna element of a plurality of second antenna elements in a second antenna array on a second surface of the repeater device, where the selection of the at least one first antenna element on the first surface and the corresponding at least one second antenna element on the second surface is based on a first direction of signal reception with respect to the first antenna array, wherein the second surface is opposite to the first surface. The operations may further comprise controlling the selected at least one first antenna element on the first surface to receive a beam of radio frequency (RF) signal in a first radiation pattern from a first network node in a first direction. The operations may further comprise transmitting the beam of RF signal in a second radiation pattern to a second network node in a second direction from the at least one second antenna element coupled to the selected at least one first antenna element, where the second radiation pattern is broader than the first radiation pattern.

While various embodiments described in the present disclosure have been described above, it should be understood that they have been presented by way of example, and not limitation. It is to be understood that various changes in form and detail can be made therein without departing from the scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in a non-transitory computer-readable medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments but should be defined only in accordance with the following claims and their equivalents.

What is claimed is:
1. A first repeater device, comprising:
 a first antenna array on a first surface, wherein
  the first antenna array comprises a plurality of first antenna elements, and
  the plurality of first antenna elements is configured to receive two or more beams of radio frequency (RF) signals in a first radiation pattern from different directions;
 a second antenna array on a second surface opposite to the first surface, wherein
  the second antenna array comprises a plurality of second antenna elements, and
  each first antenna element of the plurality of first antenna elements on the first surface is coupled to at least one second antenna element of the plurality of second antenna elements on the second surface; and
control circuitry configured to:
  select at least one first antenna element of the plurality of first antenna elements and a corresponding at least one second antenna element of the plurality of second antenna elements based on a first direction of signal reception among the different directions with respect to the first antenna array;
  control the selected at least one first antenna element on the first surface to selectively receive a beam of RF signal of the two or more beams of RF signals in the first radiation pattern from a first network node in the first direction; and
  transmit the beam of RF signal in a second radiation pattern to a second network node in a second direction from the at least one second antenna element coupled to the selected at least one first antenna element, wherein
    the second radiation pattern is broader than the first radiation pattern,
    the first network node and the second network node are in a non-line-of-sight,
    the first repeater device is a passive repeater device, and
    the first repeater device is configured to establish a wireless communication between the first network node and the second network node based on:
      the selective reception of the beam of RF signal of the two or more beams of RF signals, in the first radiation pattern and in the first direction, from the first network node, and
      re-transmission of the received beam of RF signal, in the second radiation pattern and in the second direction, to the second network node.

2. The first repeater device of claim 1, further comprising:
a plurality of switches configured to couple each first antenna element of the plurality of first antenna elements on the first surface to the at least one second antenna element of the plurality of second antenna elements on the second surface; and
one or more power sources to power the plurality of switches.

3. The first repeater device of claim 2,
the control circuitry is further configured to:
  activate a first set of switches of the plurality of switches based on the selected at least one first antenna element; and
  deactivate a second set of switches of the plurality of switches based on the selected at least one first antenna element,
the first set of switches couples the selected at least one first antenna element on the first surface to the corresponding at least one second antenna element on the second surface, and
the second set of switches couples remaining first antenna elements of the plurality of first antenna elements on the first surface to corresponding second antenna elements of the plurality of second antenna elements on the second surface.

4. The first repeater device of claim 3, wherein based on the deactivation of the second set of switches, the remaining first antenna elements of the plurality of first antenna elements and the corresponding second antenna elements of the plurality of second antenna elements are deactivated.

5. The first repeater device of claim 1, further comprising one of:

a focusing element configured to focus the beam of RF signal received from the first network node on to the selected at least one first antenna element; or
  a reflecting element configured to direct the beam of RF signal received from the first network node towards the selected at least one first antenna element.

6. The first repeater device of claim 5, wherein the focusing element is a lens.

7. The first repeater device of claim 1, wherein
the first antenna array is one of a single-polarized array, a dual polarized array, or a circularly polarized array, and
the second antenna array is one of a single-polarized array, a dual polarized array, or a circularly polarized array.

8. The first repeater device of claim 1, wherein
the first antenna array is one of a one dimension array or a two-dimensional array, and
the second antenna array is one of a one dimension array or a two-dimensional array.

9. The first repeater device of claim 1, wherein
the first network node is one of a base station, a small cell, or another a second repeater device, and
the second network node is one of a user equipment (UE), a customer premise equipment (CPE), or a third network node.

10. A first repeater device, comprising:
a first antenna array on a first surface, wherein
  the first antenna array comprises a plurality of first antenna elements, and
  the plurality of first antenna elements is configured to potentially transmit two or more first beams of radio frequency (RF) signals in a first radiation pattern towards different directions; and
a second antenna array on a second surface opposite to the first surface, wherein
  the second antenna array comprises a plurality of second antenna elements, and
  each first antenna element of the plurality of first antenna elements on the first surface is coupled to at least one second antenna element of the plurality of second antenna elements on the second surface; and
control circuitry configured to:
  select at least one first antenna element of the plurality of first antenna elements and a corresponding at least one second antenna element of the plurality of second antenna elements based on a first direction of signal transmission among the different directions with respect to the first antenna array;
  control the at least one second antenna element that is on the second surface and coupled to the selected at least one first antenna element, to selectively receive a second beam of RF signal in a second radiation pattern from a first network node in a second direction; and
  transmit the second beam of RF signal in the first radiation pattern to a second network node in the first direction from the selected at least one first antenna element on the first surface, wherein
    the first radiation pattern is narrower than the second radiation pattern,
    the first network node and the second network node are in a non-line-of-sight,
    the first repeater device is a passive repeater device, and
    the first repeater device is configured to establish a wireless communication between the first network node and the second network node based on:

the selective reception of the second beam of RF signal, in the second radiation pattern and in the second direction, from the first network node, and selective re-transmission of the received second beam of RE signal, in the first radiation pattern and in the first direction, to the second network node.

11. The first repeater device of claim 10, wherein
the first network node is one of a user equipment (UE) or a customer premise equipment (CPE), and
the second network node is one of a base station, a small cell, or a second repeater device.

12. The first repeater device of claim 10, further comprising:
a plurality of switches configured to couple each first antenna element of the plurality of first antenna elements on the first surface to the at least one second antenna element of the plurality of second antenna elements on the second surface; and
one or more power sources to power the plurality of switches.

13. The first repeater device of claim 12, wherein the control circuitry is further configured to:
activate a first set of switches of the plurality of switches based on the selected at least one first antenna element; and
deactivate a second set of switches of the plurality of switches based on the selected at least one first antenna element,
the first set of switches couples the selected at least one first antenna element on the first surface to the corresponding at least one second antenna element on the second surface, and
the second set of the switches couples remaining first antenna elements of the plurality of first antenna elements on the first surface to corresponding second antenna elements of the plurality of second antenna elements on the second surface.

14. The first repeater device of claim 13, wherein based on the deactivation of the second set of switches, the remaining first antenna elements of the plurality of first antenna elements and the corresponding second antenna elements of the plurality of second antenna elements are deactivated.

15. The first repeater device of claim 10, further comprising one of:
a lens configured to focus the beam of RF signal transmitted in the first direction to the second network node by the selected at least one first antenna element; or
a reflecting element configured to direct the second beam of RF signal transmitted by the selected at least one first antenna element towards the second network node in the first direction.

16. A method of operation by a repeater device, the method comprising:
selecting, by control circuitry of the repeater device, at least one first antenna element of a plurality of first antenna elements in a first antenna array and a corresponding at least one second antenna element of a plurality of second antenna elements in a second antenna array, wherein
the first antenna array is on a first surface of the repeater device, the second antenna array is on a second surface of the repeater device, the selection of the at least one first antenna element on the first surface and the corresponding at least one second antenna element on the second surface is based on a first direction of signal reception with respect to the first antenna array, and the second surface is opposite to the first surface;

controlling, by the control circuitry, the selected at least one first antenna element on the first surface to selectively receive a beam of radio frequency (RF) signal in a first radiation pattern from a first network node in the first direction;

transmitting, by the control circuitry, the beam of RF signal in a second radiation pattern to a second network node in a second direction from the corresponding at least one second antenna element coupled to the selected at least one first antenna element, wherein the second radiation pattern is broader than the first radiation pattern, the first network node and the second network node are in a non-line-of-sight, and the repeater device is a passive repeater device; and establishing, by the repeater device, a wireless communication between the first network node and the second network node based on:

the selective reception of the beam of RF signal among two or more beams of RF signals, in the first radiation pattern and in the first direction, from the first network node, wherein the two or more beams of RF signals arrive at the repeater device from different directions, wherein the different directions include the first direction, and re-transmission of the received beam of RF signal, in the second radiation pattern and in the second direction, to the second network node.

17. The method of claim 16, further comprising:

activating, by the control circuitry, a first set of switches of a plurality of switches of the repeater device based on the selected at least one first antenna element; and deactivating, by the control circuitry, a second set of switches of the plurality of switches based on the selected at least one first antenna element, wherein the first set of switches couples the selected at least one first antenna element on the first surface to the corresponding at least one second antenna element on the second surface, the second set of the switches couples remaining first antenna elements of the plurality of first antenna elements on the first surface to corresponding second antenna elements of the plurality of second antenna elements on the second surface, and based on the deactivation of the second set of switches, the remaining first antenna elements of the plurality of first antenna elements and the corresponding second antenna elements of the plurality of second antenna elements are deactivated.

* * * * *